(12) United States Patent  (10) Patent No.: US 9,003,442 B2
Carney et al. (45) Date of Patent: Apr. 7, 2015

(54) SHARED LOCAL GOVERNMENT CHANNEL

(75) Inventors: Mark Douglas Carney, Sterling, VA (US); Dante John Pacella, Charles Town, WV (US); Jeffrey A. Jackson, Coppell, TX (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 13/324,283

(22) Filed: Dec. 13, 2011

(65) Prior Publication Data

US 2013/0152143 A1  Jun. 13, 2013

(51) Int. Cl.
| | |
|---|---|
| *H04N 7/10* | (2006.01) |
| *H04N 7/173* | (2011.01) |
| *G06Q 30/00* | (2012.01) |
| *H04J 3/00* | (2006.01) |
| *H04N 21/2225* | (2011.01) |
| *H04N 21/262* | (2011.01) |
| *H04N 21/488* | (2011.01) |
| *H04N 21/81* | (2011.01) |

(52) U.S. Cl.
CPC . *H04J 3/00* (2013.01); *G06Q 30/00* (2013.01); *H04N 21/2225* (2013.01); *H04N 21/26208* (2013.01); *H04N 21/26233* (2013.01); *H04N 21/4882* (2013.01); *H04N 21/814* (2013.01)

(58) Field of Classification Search
CPC .......... H04N 21/236; H04N 21/23614; H04N 21/2365
USPC ................................................ 725/32, 36, 35
See application file for complete search history.

(56) References Cited

U.S. PATENT DOCUMENTS

| | | | | |
|---|---|---|---|---|
| 5,200,823 | A * | 4/1993 | Yoneda et al. | 348/473 |
| 5,642,153 | A * | 6/1997 | Chaney et al. | 725/40 |
| 6,976,266 | B1 * | 12/2005 | Chaney et al. | 725/39 |
| 7,299,485 | B2 * | 11/2007 | Chaney et al. | 725/39 |
| 2002/0102094 | A1 * | 8/2002 | Hawkins | 386/83 |
| 2002/0133542 | A1 * | 9/2002 | Fujii et al. | 709/203 |
| 2002/0138313 | A1 * | 9/2002 | Fujii et al. | 705/5 |
| 2003/0135605 | A1 * | 7/2003 | Pendakur | 709/224 |
| 2005/0125824 | A1 * | 6/2005 | Bienstock | 725/39 |
| 2005/0262542 | A1 * | 11/2005 | DeWeese et al. | 725/106 |
| 2005/0278773 | A1 * | 12/2005 | DeCinque et al. | 725/138 |
| 2006/0041921 | A1 * | 2/2006 | Hane | 725/117 |
| 2006/0075434 | A1 * | 4/2006 | Chaney et al. | 725/48 |
| 2006/0117350 | A1 * | 6/2006 | Stallworth | 725/50 |
| 2007/0287451 | A1 * | 12/2007 | Seo et al. | 455/434 |
| 2008/0016545 | A1 * | 1/2008 | DeCinque et al. | 725/138 |
| 2008/0046915 | A1 * | 2/2008 | Haeuser et al. | 725/25 |
| 2009/0028192 | A1 * | 1/2009 | Rieger et al. | 370/535 |
| 2009/0183213 | A1 * | 7/2009 | Mukerji et al. | 725/95 |
| 2009/0199254 | A1 * | 8/2009 | White et al. | 725/110 |
| 2009/0217320 | A1 * | 8/2009 | Aldrey | 725/37 |
| 2009/0248806 | A1 * | 10/2009 | Teman | 709/206 |
| 2010/0125880 | A1 * | 5/2010 | Roewe | 725/87 |
| 2011/0113454 | A1 * | 5/2011 | Newell et al. | 725/63 |
| 2012/0066716 | A1 * | 3/2012 | Wang et al. | 725/38 |
| 2012/0192225 | A1 * | 7/2012 | Harwell et al. | 725/34 |

* cited by examiner

*Primary Examiner* — James R Sheleheda

(57) ABSTRACT

A method, performed by a computer device, may include receiving content from a first local government entity; associating a virtual channel identifier with the received content; and transmitting the received content and the virtual channel identifier on a shared local government channel, wherein the shared local government channel includes content received from a second local government entity.

19 Claims, 18 Drawing Sheets

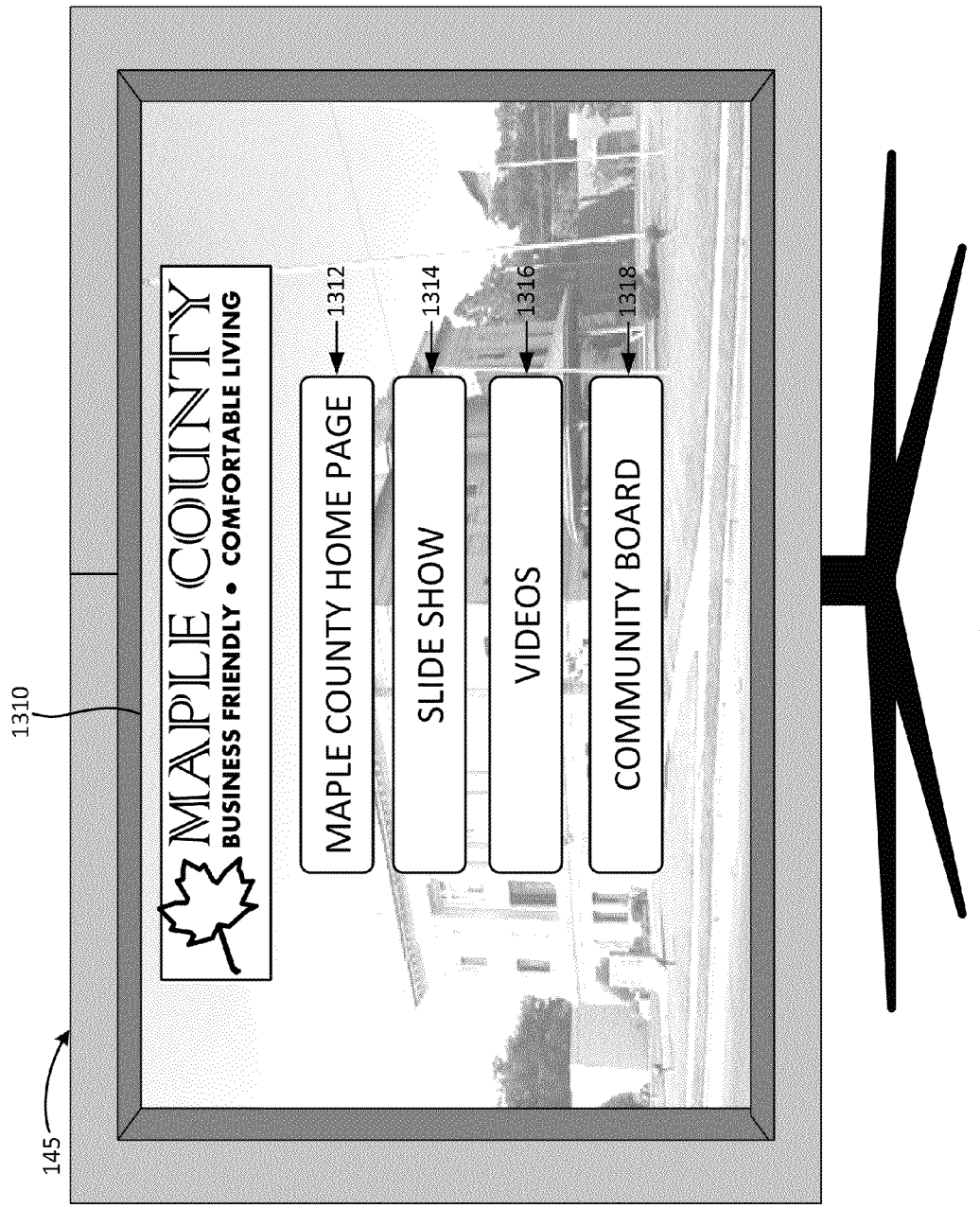

SHARED LOCAL GOVERNMENT CHANNEL

BACKGROUND INFORMATION

A provider of television services, such as a cable television provider, may be required by law (e.g., by the 1984 Cable Franchise Policy and Communications Act) to include a local government channel among the television channels provided to subscribers. A local government channel may include content provided by a local government office, associated with subscribers in a particular geographic area, such as, for example, a county government or a municipality government. Local government channels may include video content of low quality and/or sparse information content. For example, a local government station may use a cycling slide show to keep the station active. Devoting a channel for delivering content from a local government station may waste bandwidth.

BRIEF DESCRIPTION OF THE DRAWINGS

FIGS. 13A-13C are diagrams of exemplary user interfaces that may be provided by a set-top box according to an implementation described herein.

DETAILED DESCRIPTION OF PREFERRED EMBODIMENTS

The following detailed description refers to the accompanying drawings. The same reference numbers in different drawings identify the same or similar elements.

An implementation described herein may relate to providing a portal to local government stations for submitting content to a provider of television services. Content from multiple local government stations may be sent as formatted text data and/or graphic data via a shared local government channel. Transmitting data as formatted text and/or graphic data may significantly reduce bandwidth in comparison to a slide show transmitted as video data. A particular local government station may be assigned a virtual channel identifier and content associated with the particular government station may be identified by a customer's set-top box using the virtual channel identifier. The set-top box may store content associated with the particular local government station in a cache. When the customer switches to the local government channel using the set-top box, content (e.g., a slide show) from the cache may be presented.

The portal may enable the local government station to upload video content. The video content may be stored at a video-on-demand (VOD) server and an indication may be sent via the shared local government channel that video content is available. The customer may select to access the video content and the set-top box may request the video content from the VOD server. If a local government station requires transmission of a real-time video broadcast, the local government station may use the portal to schedule the real-time video broadcast on a calendar. The calendar may indicate time slots available for real-time video broadcasts and if a first local government station schedules a broadcast on the shared local government channel, the scheduled time slot may become unavailable for other local government stations.

The portal may provide templates that may be used by a local government station to generate a slide show and upload text and/or other types of media (e.g., graphical images, audio files, video files, etc.). Furthermore, the portal may enable a local government station to provide interactive content to customers. For example, the local government station may prompt customers to provide input, such as, for example, to electronically sign a petition, provide comments, fill out a questionnaire, etc. A customer may enter input using, for example, a remote control, and the input may be sent to the portal using a data upload channel. Furthermore, the portal may enable the local government station to manage a public community message board that may be provided via the shared local government channel. Customers may upload messages to the community board and may read messages posted by other customers.

Figure 1:
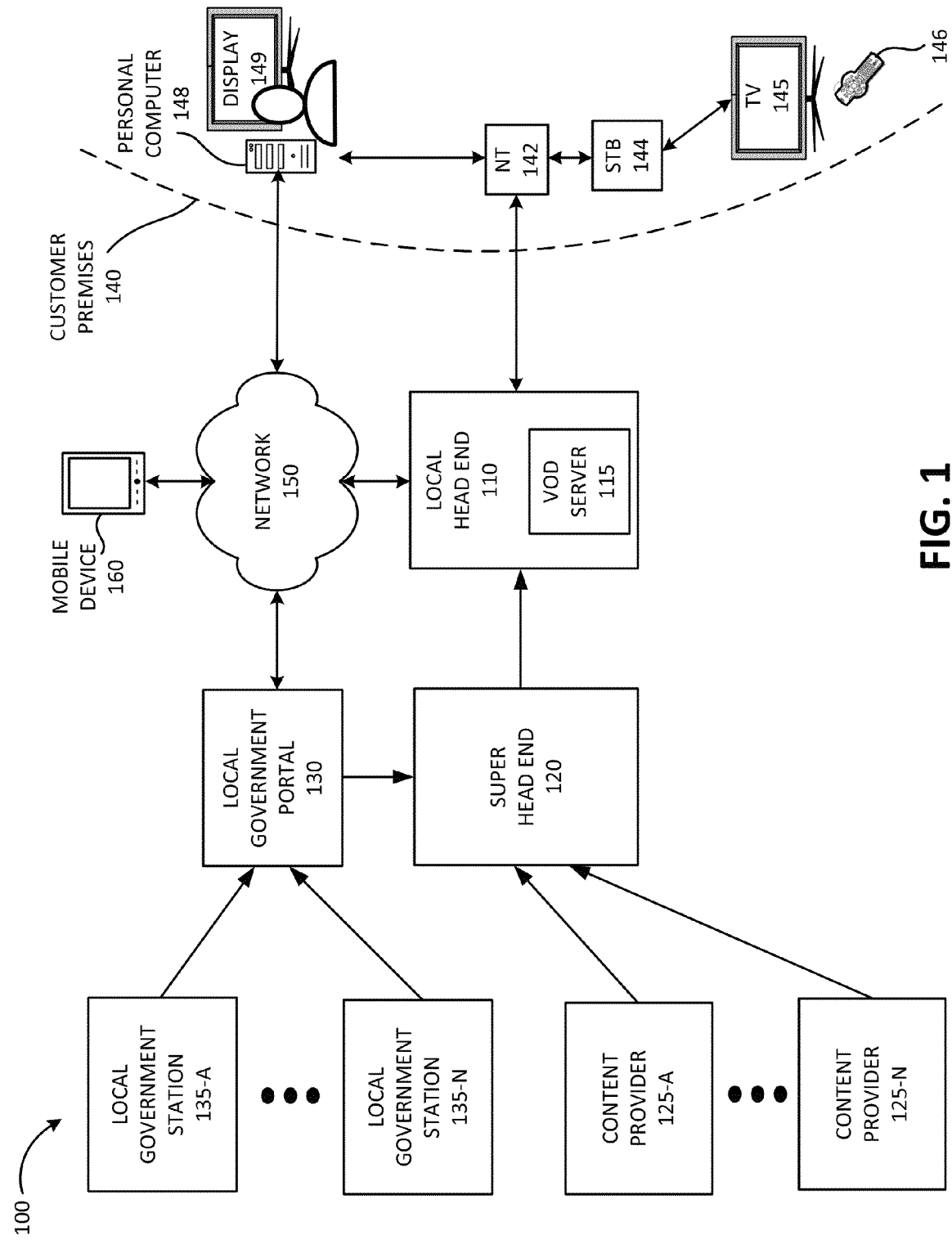
FIG. 1 is a diagram illustrating an exemplary environment according to an implementation described herein.

FIG. 1 is a diagram of an exemplary environment 100 in which the systems and/or methods described herein may be implemented. As shown in FIG. 1, environment 100 may include a local head end 110, a super head end 120, one or more content providers 125-A to 125-N (referred to herein collectively as "content providers 125" and individually as "content provider 125"), one or more local government stations 135-A to 135-N (referred to herein collectively as "local government stations 135" and individually as "local government station 135"), customer premises 140, a network 150, and a mobile device 160.

While FIG. 1 depicts a single local head end 110, a single customer premises 140, a single network 150, and a single mobile device 160 for illustrative purposes, in practice, environment 100 may include multiple local head ends 110, multiple customer premises 140, multiple networks 150, and/or multiple mobile devices 160.

Local head end 110 may include one or more devices, such as server devices, that ingest content, store content, format content, and/or deliver content to customer premises 140 and/or mobile device 160. For example, local head end 110 may provide television channels, including content received from content providers 125 and including content from a particular local government station 135 via a shared local government channel. Furthermore, local head end 110 may receive requests for content from customer premises 140 and/or mobile device 160. While local head end 110 is illustrated in FIG. 1 as connecting to a single customer premises 140 for explanatory purposes, in practice, local head end 110 may connect to multiple customer premises 140 (and/or to multiple mobile devices 160). For example, local head end 110 may deliver content to customer premises 140 located within a particular geographic area. Local head end 110 may include a VOD server 115.

VOD server 115 may include one or more devices, such as server devices, that store and provide content on demand. For example, VOD server 115 may include a catalog of content that may be accessed by a customer using a device associated with customer premises 140 or using mobile device 160. The customer may select a particular content (e.g., a movie) to purchase and VOD server 115 may stream the purchased content to customer premises 140 (and/or to mobile device 160) when the customer selects to consume the purchased content. Furthermore, VOD server 115 may include video content received from local government station 135 via local government portal 130.

Super head end 120 may include one or more devices, such as server devices, that ingest content, store content, format content, and/or deliver content to local head end 110. For example, super head end 120 may ingest content from content providers 125 at a national (and/or multi-region level) and provide the ingested content to one or more local head ends 110.

Content provider 125 may include one or more devices, such as server devices, that provide content to super head end 120. For example, content provider 125 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 125 may also include on-demand content providers (e.g., video on demand (VOD), pay per view (PPV), etc.).

Local government portal 130 may include one or more devices, such as server devices, that enable local government stations 135 to provide content to customers. For example, local government portal 130 may provide a web portal that may enable an operator of a particular local government station 135 to upload content that is to be provided to customers associated with the particular local government station 135. Local government portal 130 may multiplex content from different local government stations 135 into a shared local government channel and may provide the shared local government channel to super head end 120 and/or to local head end 110. Furthermore, local government portal 130 may receive messages from customers and may associate the messages with a community board associated with the particular local government station 130 and/or with an inbox associated with the particular local government station 130.

Local government station 135 may include one or more devices, such as server devices, that generate content for a local government. For example, local government station 135 may be associated with a particular county government or a particular municipality government.

Customer premises 140 may include a particular location (or multiple locations) associated with a customer. For example, customer premises 140 may include the customer's home. Devices associated with customer premises 140, as well as mobile device 160, may receive content, such as video content, via local head end 110. Devices associated with customer premises 140, as well as mobile device 160, may be considered "user devices" and/or "network devices." Customer premises 140 may include a network terminal (NT) 142, a set top box (STB) 144, a television 145, a remote control 146, a personal computer 148, and a display 149.

NT 142 may receive content from local head end 110 via a connection, such as, for example, via a fiber optic cable connection, a coaxial cable connection, a wireless connection, and/or another type of connection. Furthermore, NT 142 may send information from a device associated with customer premises 140 to local head end 110. In one implementation, NT 142 may include an optical network terminal and NT 142 and local head end 110 may form part of a high-speed fiber optic network (e.g., FiOS™). In another implementation, NT 142 may include a cable modem. In yet another implementation, NT 142 may include a fixed wireless transceiver. Additionally or alternatively, NT 142 may include a layer 2 and/or layer 3 network device, such as a switch, router, firewall, and/or gateway. Customer premises 140 may receive one or more services via the connection between NT 142 and local head end 110, such as, for example, a television service, Internet service, and/or voice communication (e.g., telephone) service.

STB 144 may receive content and output the content to television 145 for display. STB 144 may include a component (e.g., a cable card or a software application) that interfaces with (e.g., plugs into) a host device (e.g., a personal computer, television 145, a stereo system, etc.) and allows the host device to display content. STB 144 may also be implemented as a home theater personal computer (HTPC), an optical disk player (e.g., digital video disk (DVD) or Blu-Ray™ disc player), a cable card, etc. STB 144 may receive commands and/or other type of data from other devices, such as remote control 146, and may transmit the data to other devices in environment 100, such as, for example, local government portal 130.

Television 145 may output content received from STB 144. Television 145 may include speakers as well as a display. Remote control 146 may issue wired or wireless commands for controlling other electronic devices, such as television 145 and/or STB 144. Remote control 146, in conjunction with STB 144, may allow a customer to interact with an application running on STB 144, such as an application to provide content from a shared local government channel. Other types of devices (e.g., a keyboard, mouse, mobile phone, touch screen, pointing device, motion sensing input device, etc.) may be used instead of, or in addition to, remote control 146, in order to control television 145 and/or STB 144.

Personal computer 148 may include a desktop computer, a laptop computer, a tablet computer, a mobile communication device, a personal digital assistant (PDA), or another type of computation and/or communication device. Personal computer 148 may include a microphone to capture audio, a camera to capture images or video. Personal computer 148 may include display 149 for displaying images and/or video content received from content service system 130. Personal computer 148 may also include a speaker for playing audio signals.

Network 150 may include one or more wired and/or wireless networks. For example, network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof, and/or another type of wireless network. Additionally, or alternatively, network 150 may include a local area network (LAN), a wide area network (WAN), a metropolitan area network (MAN), an ad hoc network, an intranet, a fiber optic-based network (e.g., a fiber optic service network), a television network, and/or a combination of these or other types of networks. Network 150 may enable local head end 110 to communicate with mobile device 160 and/or with local government portal 130.

Mobile device 160 may include a mobile communication device, such as a mobile phone, a smart phone, a tablet computer, a laptop, a PDA, or another type of portable communication device. Mobile device 160 may receive content, such as content from a shared local government channel, from local head end 110 via network 150. In one embodiment, mobile device 160 may be associated with a customer account associated with customer premises 140. In another embodiment, mobile device 160 need not be associated with customer premises 140.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
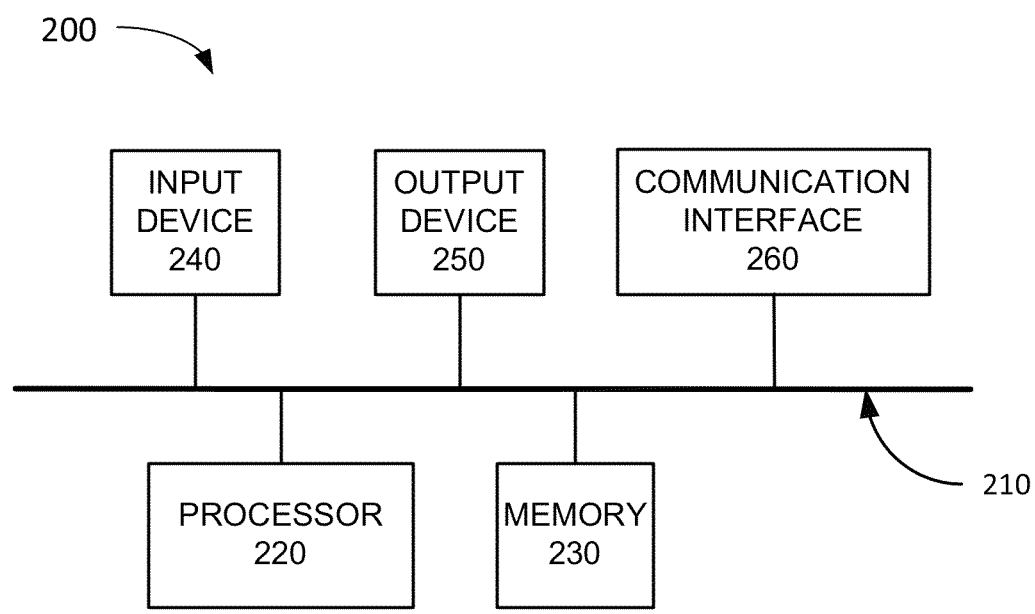
FIG. 2 is a diagram illustrating exemplary components of a device of FIG. 1.

FIG. 2 is a diagram illustrating exemplary components of a device 200 according to an implementation described herein. Local government portal 130, STB 144, personal computer 148, mobile device 160, and/or other devices in environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to ingestion, reception, presentation, and/or management of content associated with a local government channel. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3A:
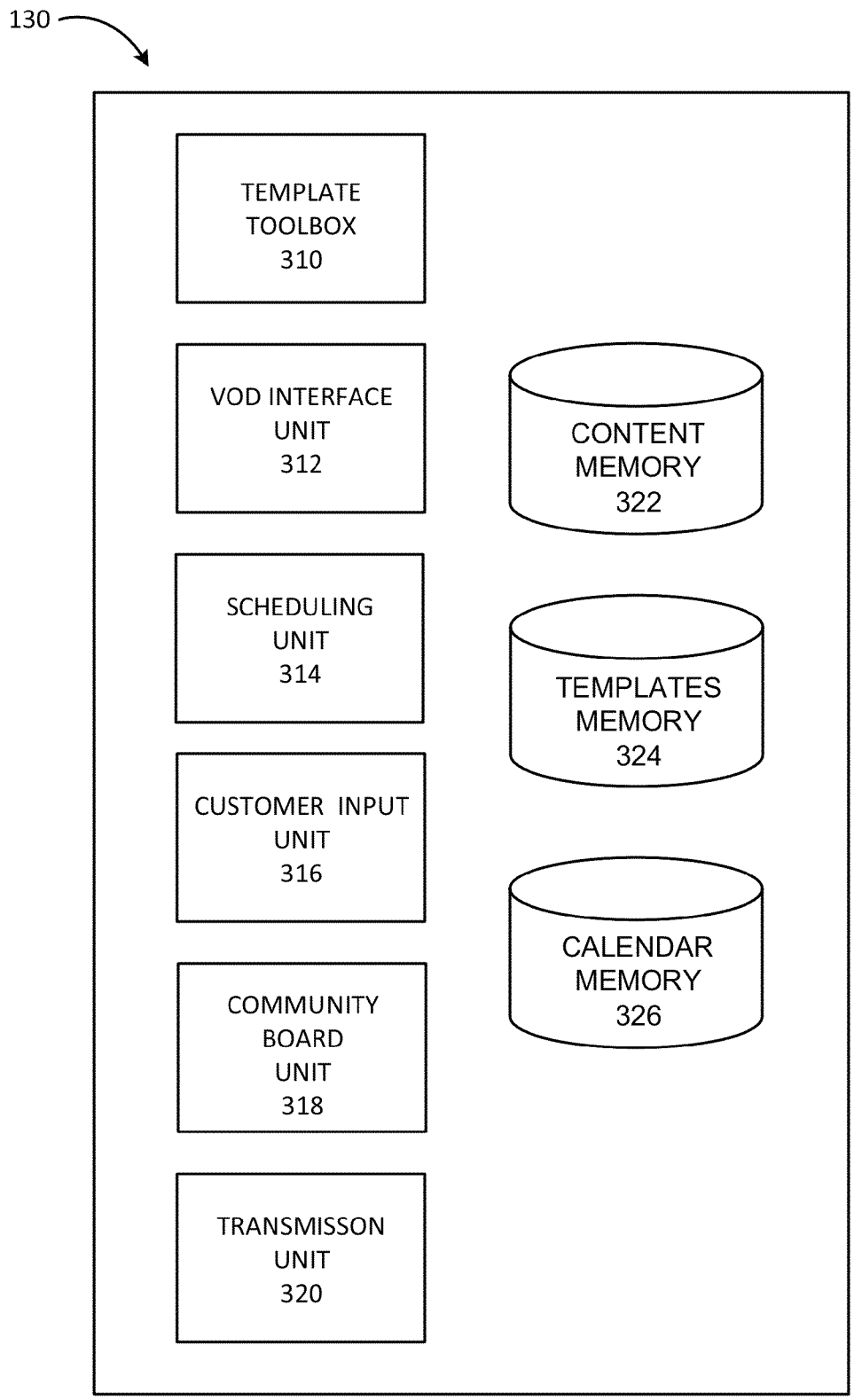
FIG. 3A is a diagram illustrating exemplary functional components of the local government portal of FIG. 1.

FIG. 3A is a diagram of exemplary functional components of local government portal 130. The functional components of local government portal 130 may be implemented, for example, via processor 220 executing instructions from memory 230. As shown in FIG. 3A, local government portal 130 may include a template toolbox 310, a VOD interface unit 312, a scheduling unit 314, a customer input unit 316, a community board unit 318, a transmission unit 320, a content memory 322, a templates memory 324, and a calendar memory 326.

Template toolbox 310 may provide a user interface to local government station 135 that enables local government station 135 to use templates from templates memory 324 to organize content. For example, an administrator associated with local government station 135 may select a template for a slide show and may use the template to create slides that include content that is to be provided to customers associated with local government station 135. Furthermore, template toolbox 310 may enable the administrator to create a slide that includes interactive content (e.g., that prompts a customer for input and that sends input from the customer to local government portal 130).

VOD interface unit 312 may determine a particular VOD server 115 for a particular local government station 135, may upload video content received from the particular local government station 135, and may store an indication of available video content in content memory 322 to be included in content provided to customers associated with the particular local government station 135.

Scheduling unit 314 may interact with calendar memory 326 to schedule real-time broadcasts for local government stations 135. Customer input unit 316 may receive input from customers associated with the particular local government station 135 and may determine how to process the received input. For example, customer input unit 316 may determine that the received input corresponds to a posting to a community message board and may store the received input in connection with the community message board. As another example, customer input unit 316 may determine that the received input corresponds to a message associated with a particular inbox and may store the received input with connection with the particular inbox.

Community board unit 318 may provide a user interface to local government station 135 to enable local government station 135 to manage a community message board. For example, an administrator associated with local government station 135 may select a template for a community message board, may review and approve or disapprove postings to the community message board, may set rules for posting to the community message board, and/or may perform any other function associated with the community message board.

Transmission unit 320 may multiplex content from multiple local government stations 135 into a shared local government channel and provide the shared local government channel, in a particular format, to super head end 120 and/or to local head end 110. Furthermore, transmission unit 320 may interact with an emergency broadcast system (e.g., Emergency Alert System (EAS) and/or a local emergency system). When an emergency transmission is initiated by the emergency broadcast system, transmission unit 320 may pause transmitting content associated with local government stations 135 and may forward the emergency transmission along the shared local government channel.

Content memory 322 may store content associated with a particular local government station 135. Exemplary content that may be stored in content memory 322 is described below with reference to FIG. 3B. Templates memory 324 may store templates for generating content in a particular layout. For example, templates memory 324 may store templates for slide shows and/or templates for community message boards.

Calendar memory 326 may store one or more calendars associated with local government portal 130. The one or more calendars may be used to schedule live transmission and/or to schedule other events. In one implementation, a calendar may be associated with super head end 120. In another implementation, a particular calendar may be associated with a particular local head end 110. For example, multiple live transmissions may be scheduled at a same time if the local government stations 135 are associated with different local head ends 110.

Although FIG. 3A shows exemplary functional components of local government portal 130, in other implementations, local government portal 130 may include fewer functional components, different functional components, differently arranged functional components, or additional functional components than depicted in FIG. 3A. Additionally or alternatively, one or more functional components of local government portal 130 may perform functions described as being performed by one or more other functional components of local government portal 130.

Figure 3B:
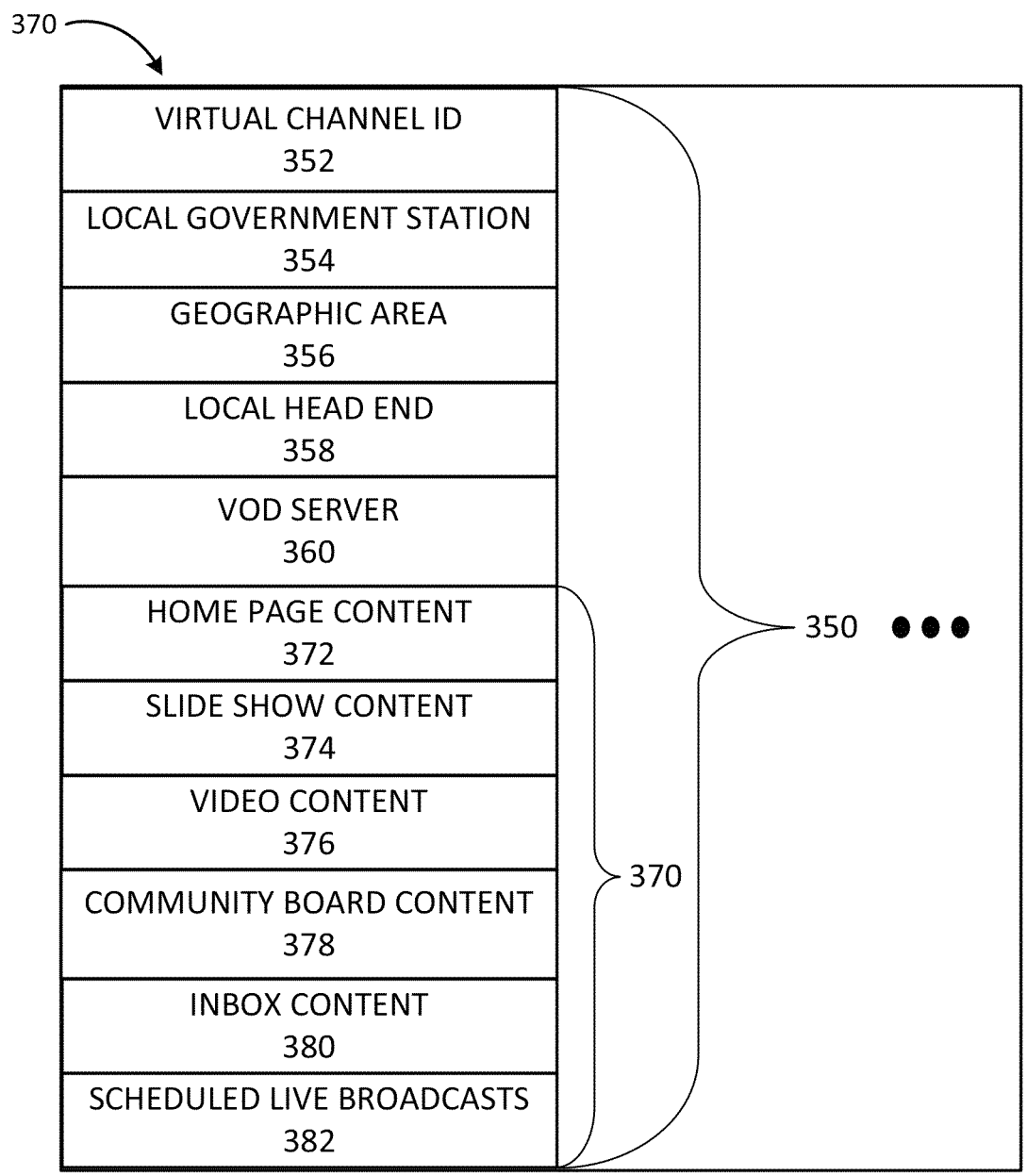
FIG. 3B is a diagram illustrating exemplary components that may be stored in the content memory of FIG. 3A.

FIG. 3B is a diagram illustrating exemplary components that may be stored in the content memory 322. As shown in FIG. 3B, content memory 322 may include one or more local government channel records 350. Each local government channel record 350 may be associated with a particular local government station 135. Local government channel record 350 may include a virtual channel identifier (ID) field 352, a local government station field 354, a geographic area field 356, a local head end field 358, a VOD server field 360, and a content field 370.

Virtual channel ID field 352 may store a particular virtual channel ID associated with a particular local government station 135. Local government station field 354 may store information identifying the particular local government station 135 (e.g., a Uniform Resource Identifier (URI) associated with the particular local government station 135). Furthermore, local government station field 354 may identify a particular local government (e.g., county or municipality government) associated with the particular local government station 135.

Geographic area field 356 may store information identifying a particular geographic area associated with the particular local government station. Information identifying the particular geographic area may be used to determine which customers are to be associated with the particular local government station, which local head end 110 is to be associated with the particular local government station, and/or which VOD server 115 is to be associated with the particular local government station. Local head end field 358 may store information identifying a particular local head end 110 associated with the particular local government station. VOD server field 360 may store information identifying a particular VOD server 115 associated with the particular local government station.

Content field 370 may store content associated with the particular local government station. Content field 370 may include a home page content field 372, a slide show content field 374, a video content field 376, a community board content field 378, an inbox content field 380, and a scheduled live broadcasts field 382.

Home page content field 372 may store information related to a home page associated with the particular local government station (e.g., a URI associated with the particular government station and/or information obtained from the URI, such as, for example, contact information for personnel associated with the local government, etc.). Slide show content field 374 may store information related to a slide show that is to be provided for customers associated with the particular local government station. Video content field 376 may store information about video and/or audio files associated with the particular government station. For example, video content field 376 may include an indication of the availability of a video file and/or audio file, information about the video file and/or audio file (e.g., title, duration, date, etc.), and/or information about a location where the video and/or audio file is stored (e.g., a URI and/or information identifying a particular VOD server 115).

Community board content field 378 may store information about postings to a community board that is to be provided for customers associated with the particular local government station. For example, a customer may post a message to the community board and an administrator associated with the particular local government station may approve the posting to be included on the community board. Inbox content field 380 may store information about messages sent by a customer to the local government associated with the particular local government station. For example, the local government may prompt a customer for a particular type of input (e.g., sign a petition, fill out a survey, etc.) or a customer may have a question about an issue associated with the local government. Scheduled live broadcasts field 382 may store information about live broadcasts that have been scheduled by the particular local government station.

Although FIG. 3B shows exemplary components of content memory 322, in other implementations, content memory 322 may include fewer components, different components, differently arranged components, or additional components than depicted in FIG. 3B.

Figure 4:
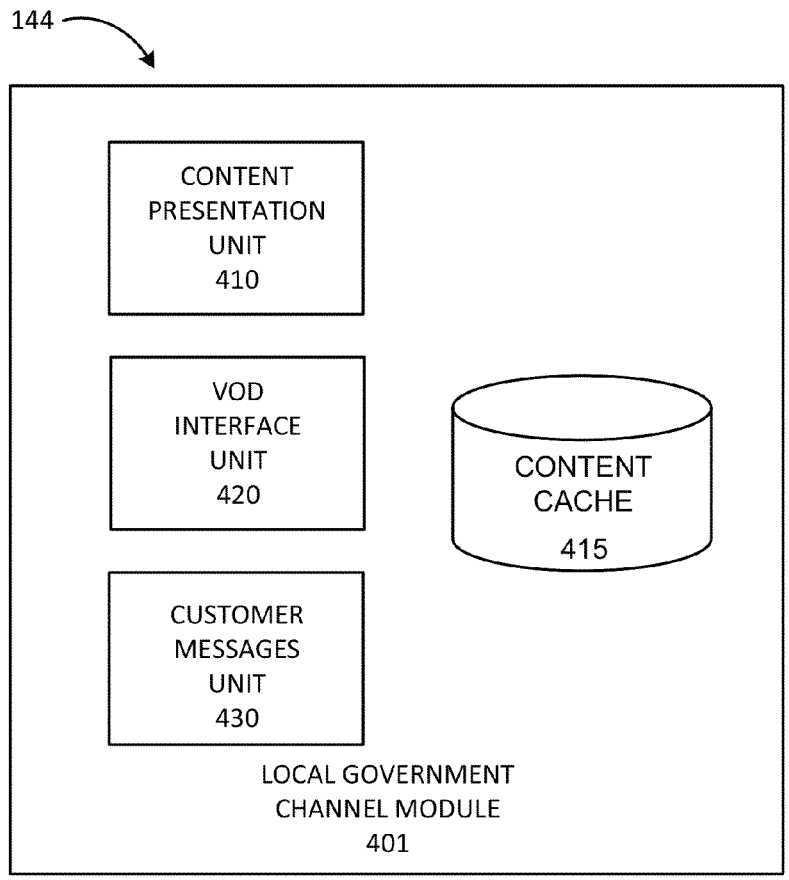
FIG. 4 is a diagram illustrating exemplary components of a set-top box according to an implementation described herein.

FIG. 4 is a diagram of exemplary functional components of STB 144, personal computer 148, or mobile device 160. The functional components of STB 144, personal computer 148, or mobile device 160 may be implemented, for example, via processor 220 executing instructions from memory 230. As shown in FIG. 4, STB 144, personal computer 148, or mobile device 160 may include a local government channel module 401. Local government channel module 401 may be provided to STB 144 (or to personal computer 148 or mobile device 160) by local government portal 130. For example, local government portal 130 may instruct super head end 120 and/or local head end 110 to include local government channel module 401 in a software update to be provided to STB 144 (or to personal computer 148 or mobile device 160). In another example, local government channel module 401 may be included on STB 144 when STB 144 is installed in customer premises 140. Local government channel module 401 may include a content presentation unit 410, a content cache 415, a VOD interface unit 420, and a customer messages unit 430.

Content presentation unit 410 may receive a shared local government channel and may identify content included in the shared local government channel that is associated with a particular virtual channel ID 352. Content presentation unit 410 may capture content associated with the particular virtual channel ID 352 and may ignore content that is not associated with the particular virtual channel ID 352. Content presentation unit 410 may store the captured content in content cache 415.

When a customer selects a local government channel (e.g., using remote control 146), content presentation unit 410 may retrieve content stored in content cache 415 and may present the content to the customer (e.g., via television 145). Content presentation unit 410 may enable the customer to interact with the presented content (e.g., by browsing slides in a slide show). Content cache 415 may store content associated with a local government channel, associated with a particular local government station 135.

VOD interface unit 420 may interface with VOD server 115 to provide video content to the customer. For example, the content stored in content cache 415 may include an indication of an available video file. The customer may select to access the video file and, in response to the selection, VOD interface unit 420 may obtain the video file from VOD server 115 and present the video file to the customer (e.g., by streaming the video file from VOD server 115 to television 145).

Customer messages unit 430 may send messages from the customer to local government portal 130. For example, the content presented to the customer may include interactive content that may enable the customer to provide input (e.g., sign a petition, answer a survey, pay a local government tax, etc.) and the customer may enter the input using remote control 146 (or using personal computer 148 or mobile device 160). As another example, content messages unit 410 may enable a customer to send a message to a local government portal 130. Customer messages unit 430 may send messages from customer premises 140 to local government portal 130 using a data uplink channel.

Although FIG. 4 shows exemplary functional components of STB 144, personal computer 148, or mobile device 160, in other implementations, STB 144, personal computer 148, or mobile device 160 may include fewer functional components, different functional components, differently arranged functional components, or additional functional components than depicted in FIG. 4. Additionally or alternatively, one or more functional components of STB 144, personal computer 148, or mobile device 160 may perform functions described as being performed by one or more other functional components of STB 144, personal computer 148, or mobile device 160.

Figure 5:
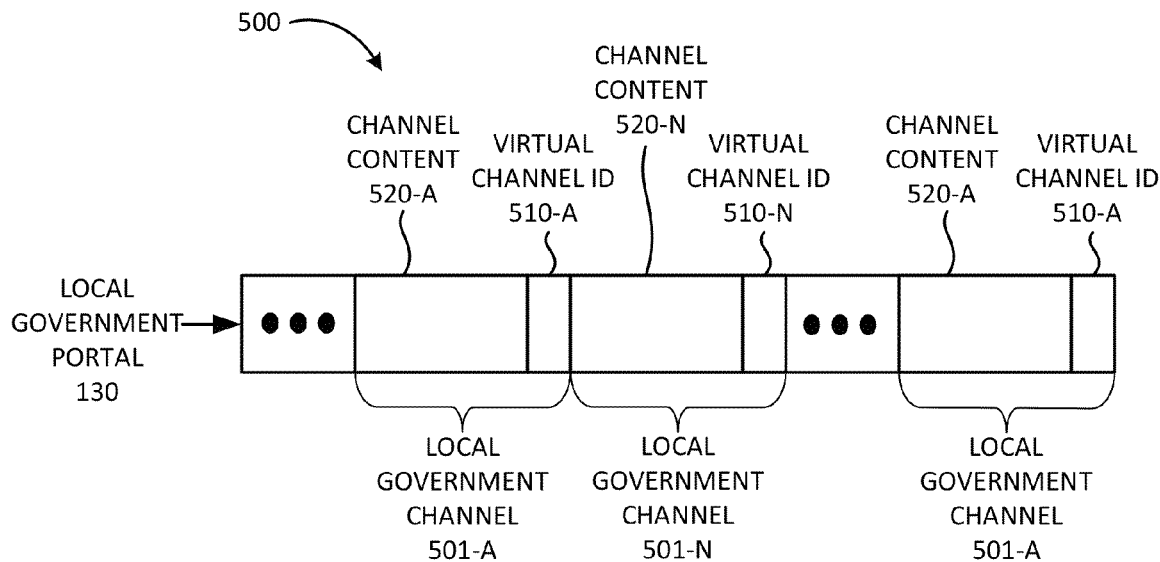
FIG. 5 is a diagram of a transmission sequence for a shared local government channel according to an implementation described herein.

FIG. 5 is a diagram of a transmission sequence 500 for a shared local government channel according to an implementation described herein. In one implementation, transmission sequence 500 may correspond to a transmission sequence of a quadrature amplitude modulation (QAM) channel. In another implementation, transmission sequence 500 may correspond to a sequence of packets in an Internet Protocol television (IPTV) scheme. In yet another implementation, transmission sequence 500 may correspond to a transmission sequence in another transmission scheme.

As shown in FIG. 5, transmission sequence 500 may include transmission of local government channel 501-A (which may be associated with local government station 135-A), followed by the next local government channel and so on, until transmission of local government channel 501-N (which may be associated with local government station 135-N). After local government channel 501-N, the transmission may be repeated starting with the transmission of local government channel 501-A.

Local government channel 501 may include a virtual channel ID 510 followed by channel content 520. Virtual channel ID 510 may identify that the content that follows is associated with a particular local government channel 501 associated with a particular local government station 135. STB 144 may use virtual channel ID 510 to determine which content to download. For example, STB 144 may start downloading content after detecting virtual channel ID 510, associated with local government station 135 that is associated with the geographic area of STB 144, and may stop downloading content after a different virtual channel ID 510 is detected. Thus, transmission sequence 500 may include content from multiple local government stations 135 which has been combined using time division multiplexing.

Channel content 520 may include formatted text data and/or image data. For example, content provided by local government station 135 may be converted to a formatted text format, such as, for example, a markup language (e.g., Hypertext Markup Language (HTML), Extensible Markup Language (XML), etc.); a page description language (e.g., PostScript, Portable Document Format (PDF), etc.); a printer command language; and/or any other type of formatted text.

Although FIG. 5 shows exemplary components of transmission sequence 500, in other implementations, transmission sequence 500 may include fewer components, different components, additional components, or differently arranged components than depicted in FIG. 5. For example, rather than transmitting a virtual channel ID at the beginning of transmission of content from a particular local government station, a virtual channel ID may be interspersed at particular intervals during transmission of content from the particular government station.

As another example, while FIG. 5 illustrates combining content from multiple local government stations 135 using time division multiplexing, in another example, the content may be combined using a different type of multiplexing. For example, content from multiple local government stations 135 may be combined onto a shared channel using code division multiple access (CDMA) by modulating content from different local government stations 135 using different codes. As another example, content from multiple local government stations 135 may be combined onto a shared channel using frequency division multiple access (FDMA) by dividing the channel into sub-channels of smaller bandwidth.

Figure 6:
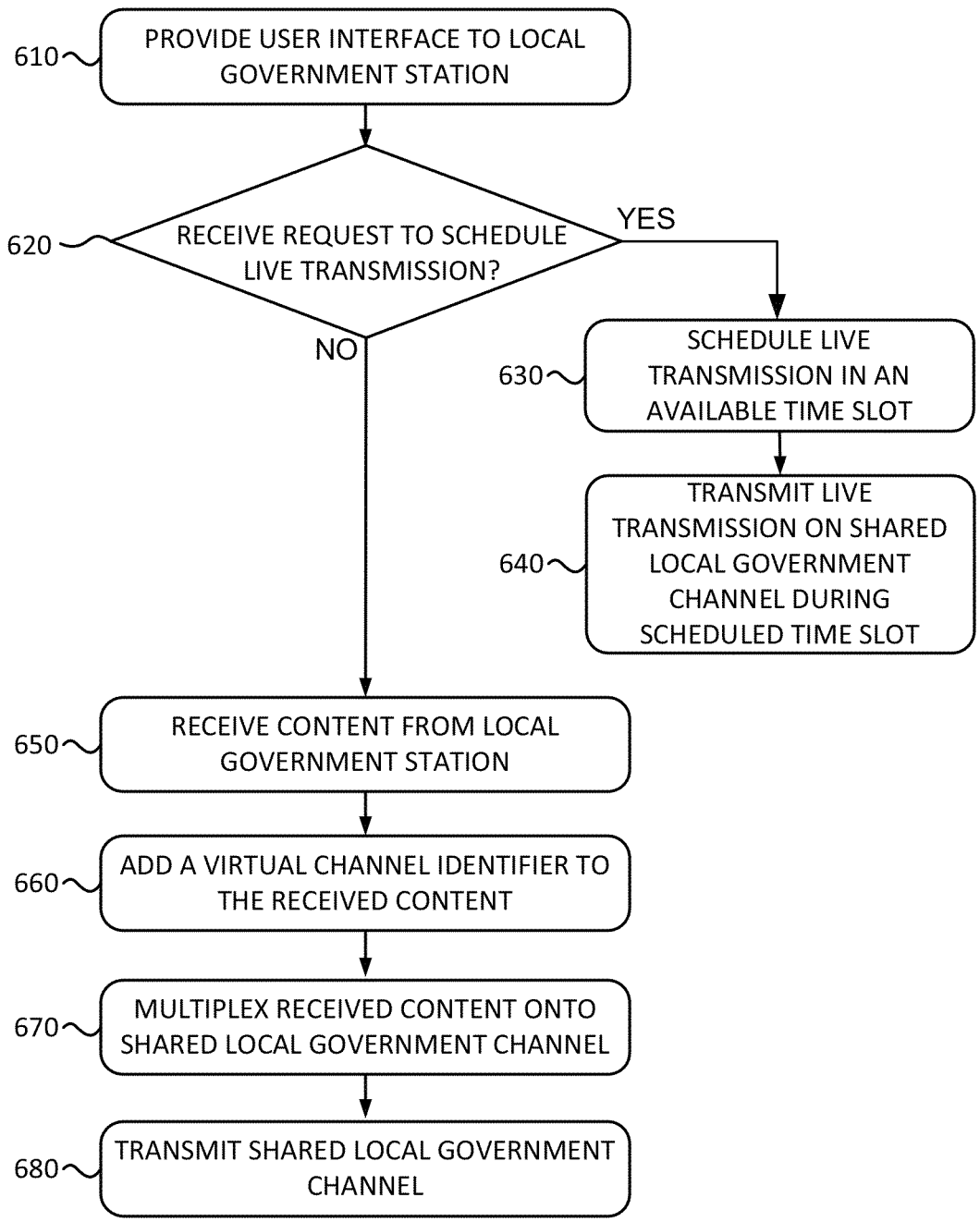
FIG. 6 is a flow chart of an exemplary process for transmitting content received from a local government station on a shared local government channel according to an implementation described herein.

FIG. 6 is a flow chart of an exemplary process for transmitting content received from a local government station on a shared local government channel according to an implementation described herein. In one implementation, the process of FIG. 6 may be performed by local government portal 130. In other implementations, some or all of the process of FIG. 6 may be performed by another device or a group of devices separate from local government portal 130 and/or including local government portal 130, such as local head end 110 and/or super head end 120.

The process of FIG. 6 may include providing a user interface to a local government station (block 610). For example, an administrator of local government station 135 may decide to upload content to local government portal 130 and may use a browser application (e.g., Internet Explorer, Mozilla Firefox, Google Chrome, Apple Safari, Opera, etc.) to access a portal web page hosted by local government portal 130 and may log into the portal web page to access the user interface. In another example, local government station 135 may download a particular application from local government portal 130 that may enable local government station 135 to interact with local government portal 130.

A determination may be made as to whether a request to schedule a live transmission was received (block 620). For example, the administrator may select a calendar tab associated with the user interface and request to schedule a live transmission from local government station 135 at a particular time. If it is determined that a request for a live transmission was received (block 620—YES), the live transmission may be scheduled in an available time slot (block 630). For example, scheduling unit 314 may provide a calendar to the administrator by accessing calendar memory 326. The calendar may indicate allowable time slots for the live transmission and may block out unavailable time slots. Thus, if a first local government station 135 schedules a live broadcast at a particular time, the particular time may become unavailable for scheduling to other local government stations 135. Information about the scheduled live broadcast may be stored in calendar memory 326 and/or in scheduled live broadcasts field 382 of content record 350 associated with local government station 135.

Since a shared local government channel may be shared by many local government stations 135, only one local government station 135 may be able to broadcast a real-time event at a time. However, as such real-time broadcasts may be infrequent, conflicts between different local government stations 135 may be rare. In an unlikely event in which two different local government stations 135 both request a same time slot for a live broadcast, a resolution process may be initiated. For example, the first local government station 135 to request a particular time slot may be given preference. In another example, a local government station 135 associated with a larger geographic area may be given preference. In yet another example, a local government station 135 associated with a larger population may be given preference. In still another implementation, a draft-style method may be adopted for resolving conflicting timeslot selections.

Once a live transmission is scheduled, the live transmission may be transmitted on the shared local government channel during the scheduled time slot (block 640). For example, at the scheduled time, scheduling unit 314 may instruct transmission unit 320 to feed a signal from the particular local government station 135 onto the shared local government channel. In one implementation, transmission unit 320 may feed the signal from the particular local government station 135 to super head end 120 and super head end 120 may distribute the signal to local head ends 110 via the shared local government channel. In another implementation, transmission unit 320 may feed the signal from the particular local government station 135 to a particular local head end 110 associated with the particular local government station 135. Thus, a shared local government channel may be dedicated to the particular local government station 135 during the live broadcast at the particular local head end 110, while other local head ends 110 may continue to receive the regular content via the shared local government channel. In this implementation, local government portal 130 may maintain different calendars for different local head ends 110 and local government stations 135 may schedule live transmissions with respect to a particular local head end 110 (and independently of other local head ends 110).

Returning to block 620, if it is determined that a request to schedule a live transmission was not received (block 620—NO), content from the local government station may be received (block 650). For example, the administrator associated with local government station 135 may use template toolbox 310 to select a template and enter content for a slide show that is to be presented to a customer when the customer selects a local government channel via STB 144. The slide show content may be converted to a particular formatted text format and stored in slide show content field 374 of content record 350 associated with the local government station. As another example, the administrator may upload video content using the user interface associated with local government portal 130 as described below with respect to FIG. 7. Information about the uploaded video content may be stored in video content field 370 of content record 350 associated with the local government station. As yet another example, the administrator may manage a community board included as part of the content that is presented to a customer when the customer selects the local government channel. For example, the administrator may approve postings sent by users to be included on the community board. The community board content may be stored in community board content field 378 of content record 350 associated with the local government station. As yet another example, the administrator may upload interactive content using the user interface (see FIG. 8). The interactive content may prompt a customer to provide a particular type of input. Input received from a customer may be stored in inbox content field 380 of content record 350 associated with the local government station.

A virtual channel identifier may be added to the received content (block 660). For example, local government portal 130 may assign virtual channel ID 510 to the content and may store virtual channel ID 510 in virtual channel ID field 352 of content record 350 associated with the local government station. The received content may be multiplexed onto a shared local government channel (block 670). For example, transmission unit 320 may include the received content in the channel content 520 that is transmitted on the shared local government channel. Transmission unit 320 may scan content memory 322 based on a list of virtual channel IDs 510 and may, for a particular virtual channel ID 510, retrieve content associated with the particular virtual channel ID 510, and multiplex the retrieved content onto the shared local government channel.

The shared local government channel may be transmitted (block 680). For example, transmission unit 320 may generate a QAM channel based on the shared local government channel and may provide the generated QAM channel, which may include multiplexed content from multiple local government stations 135, to super head end 120 as channel transmission 500. Super head end 120 may distribute the shared local government channel to local head ends 110. In another example, transmission unit 320 may provide the generated QAM channel directly to one or more local head ends 110. In another example, transmission unit 320 may generate IPTV packets based on the shared local government channel and may provide the generated IPTV packets to super head end 120 or to local head ends 110 as channel transmission 500.

Figure 7:
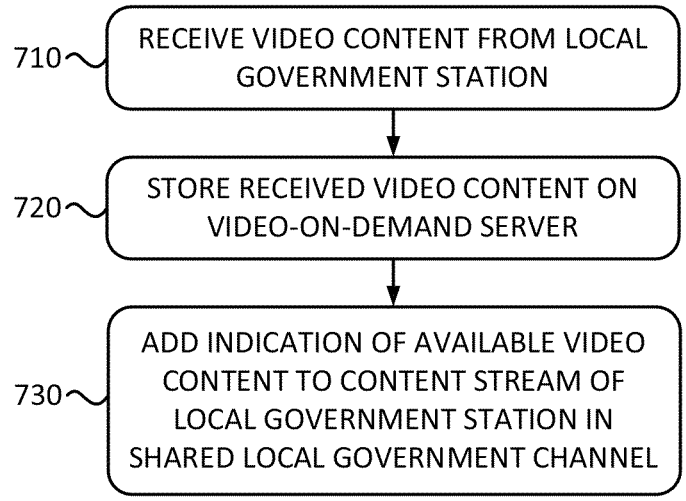
FIG. 7 is a flow chart of an exemplary process for processing video content received from a local government station according to an implementation described herein.

FIG. 7 is a flow chart of an exemplary process for processing video content received from a local government station according to an implementation described herein. In one implementation, the process of FIG. 7 may be performed by local government portal 130. In other implementations, some or all of the process of FIG. 7 may be performed by another device or a group of devices separate from local government portal 130 and/or including local government portal 130.

The process of FIG. 7 may include receiving video content from a local government station (block 710). For example, an administrator, associated with a particular local government station 135, may select a tab on a user interface, associated with local government portal 130, to manage video content. The administrator may subsequently upload video content to local government portal 130.

The received video content may be stored on a VOD server (block 720). For example, VOD interface unit 312 may determine a particular local head end 110, associated with the particular local government station 135, and may determine a particular VOD server 115 associated with the particular local head end 110. VOD interface unit 312 may provide the uploaded video content to the particular VOD server 115 and may store information about where the video content is stored in video content field 376 of content record 350 associated with the particular local government station 135.

An indication of available video content may be added to the content stream of the local government station in the shared local government channel (block 730). For example, transmission unit 320 may include information from video content field 376 in channel content 520 associated with the local government station, such as a thumbnail image associated with a video file, a name of the video file, a duration of the video file, a description of the video file, and/or any other information associated with the video file.

Figure 8:
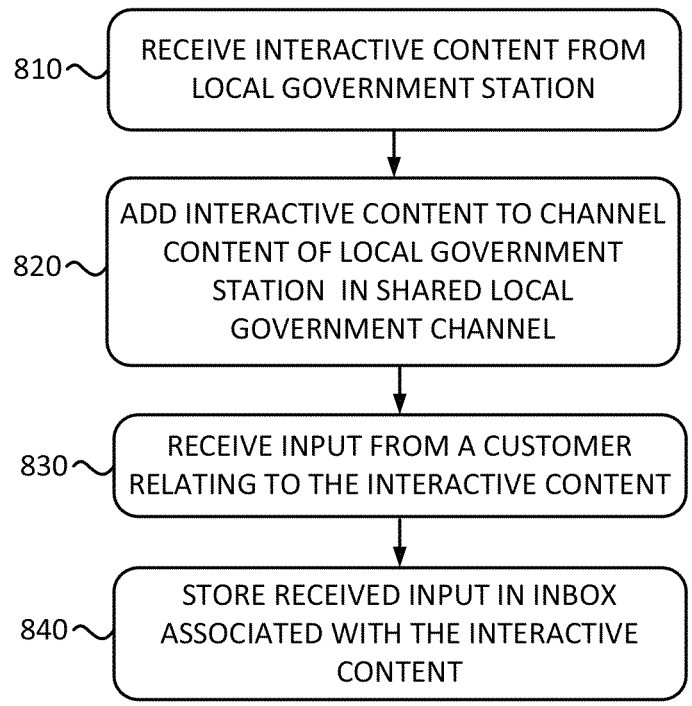
FIG. 8 is a flow chart of an exemplary process for processing interactive content received from a local government station according to an implementation described herein.

FIG. 8 is a flow chart of an exemplary process for processing interactive content received from a local government station according to an implementation described herein. In one implementation, the process of FIG. 8 may be performed by local government portal 130. In other implementations, some or all of the process of FIG. 8 may be performed by another device or a group of devices separate from local government portal 130 and/or including local government portal 130.

The process of FIG. 8 may include receiving interactive content from a local government station (block 810). For example, an administrator, associated with a particular local government station 135, may create a slide in a slide show that prompts a customer for input. For example, the administrator may create a slide that prompts the user for input, such as a slide that includes a survey, a slide that asks the customer to sign a petition, or a slide that requests particular information from the user. The administrator may select to create an inbox associated with the interactive content and messages received from customers in response to the interactive content may be designated to be stored in the created inbox. The interactive content may be added to channel content of the local government station in a shared local government channel (block 820). For example, transmission unit 320 may include the interactive content in channel content 520 associated with the local government station.

Input relating to the interactive content may be received from a customer (block 830). For example, a customer may view a slide that includes the interactive content and may enter input in response to the interactive content. Customer messages unit 430 may send the input entered by the customer to local government portal 130 along an uplink data channel along with information identifying the interactive content (e.g., information identifying a particular slide, a particular petition, a particular survey, etc.). Furthermore, in one example, the input may include information that identifies the customer (e.g., the customer's name, set-top box identifier, etc.). In another example, the input may be sent anonymously (e.g., without identifying the customer).

The received input may be stored in an inbox associated with the interactive content (block 840). For example, customer input unit 316 of local government portal 130 may receive the input and may determine the particular interactive content associated with the received input. Customer input unit 316 may further determine a particular inbox associated with the interactive content and may store the received input in the particular inbox in inbox content field 380 of content record 350 associated with the particular local government station 135.

Figure 9:
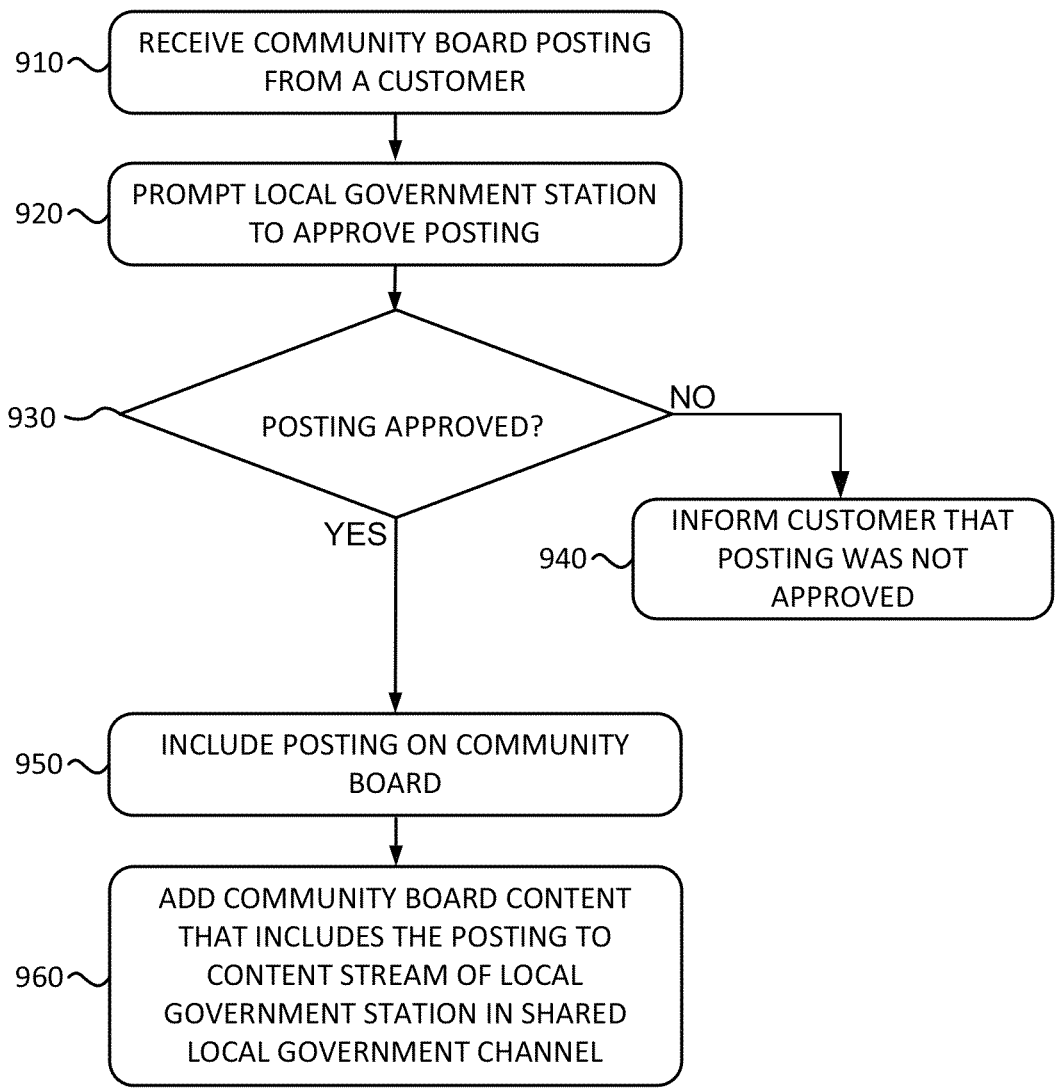
FIG. 9 is a flow chart of an exemplary process for processing a community board posting relating to a local government channel according to an implementation described herein.

FIG. 9 is a flow chart of an exemplary process for processing a community board posting relating to a local government channel according to an implementation described herein. In one implementation, the process of FIG. 9 may be performed by local government portal 130. In other implementations, some or all of the process of FIG. 9 may be performed by another device or a group of devices separate from local government portal 130 and/or including local government portal 130.

The process of FIG. 9 may include receiving a community board posting from a customer (block 910). For example, a customer may activate local government channel module 401 on STB 144 and may select an option to create a posting for the community message board associated with the local government channel. For example, the customer may create a post about a yard sale, a post about a lost pet, etc. Customer messages unit 430 may send the posting to local government portal 130.

A local government station may be prompted to approve the posting (block 920). In one example, local government portal 130 may send a notification to local government station 135, informing local government station 135 that a posting has been submitted for the community message board for approval. In another example, an administrator associated with local government station 135 may need to log into local government portal 130 and activate community board unit 318 to view postings that are in need of approval. The administrator may select to approve or disapprove the posting based on criteria established by local government station 135.

A determination may be made as to whether the posting has been approved (block 930). For example, community board unit 318 may receive input from local government station 135 either approving or disapproving the posting. If it is determined that the posting was not approved (block 930—NO), the customer may be informed that the posting was not approved (block 940). As an example, community board unit 318 may send an email to the customer at an email account associated with the customer's television service.

If it is determined that the posting was approved (block 930—YES), the posting may be included on a community board (block 950). For example, community board unit 318 may add information about the posting to community board content field 378 of content record 350 associated with local government station 135. Community board content that includes the posting may be added to the content stream of the local government station in a shared local government channel (block 960). For example, transmission unit 320 may include information from community board content field 378 in channel content 520 associated with the local government station.

Figure 10:
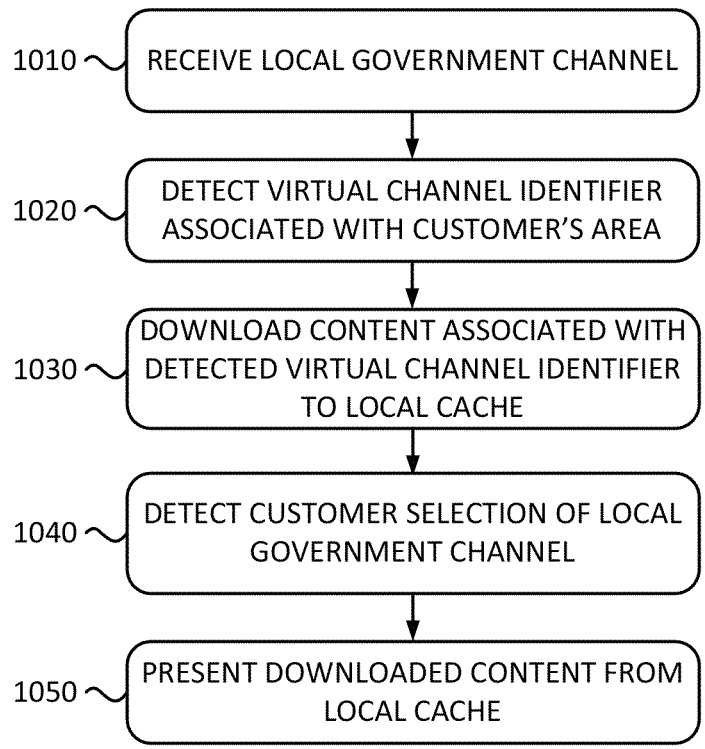
FIG. 10 is a flow chart of an exemplary process for presenting content from a shared local government channel according to an implementation described herein.

FIG. 10 is a flow chart of an exemplary process for presenting content from a shared local government channel according to an implementation described herein. In one implementation, the process of FIG. 10 may be performed by STB 144, personal computer 148, or mobile device 160. In other implementations, some or all of the process of FIG. 10 may be performed by another device or a group of devices separate from STB 144, personal computer 148, or mobile device 160 and/or including STB 144, personal computer 148, or mobile device 160.

The process of FIG. 10 may include receiving a local government channel (block 1010). For example, STB 144 may receive QAM channels from local head end 110. One of the received QAM channels may correspond to a local government channel. The local government channel may correspond to shared local government channel that includes transmission sequence 500, received from local government portal 130. A virtual channel ID 510 associated with the customer's area may be detected (block 1020). For example, content presentation unit 410 may monitor the local government channel for a particular virtual channel ID 510. The particular virtual channel ID 510 may be assigned to STB 144 based on the geographic area associated with the customer and based on the geographic area identified in geographic area field 356 of content record 350 of local government station 135. For example, if the customer is located in county X and local government station 135-X is associated with the government of county X, the customer's STB 144 may monitor the shared local government channel for virtual channel ID 510-X associated with local government station 135-X.

Content associated with the detected virtual channel ID may be downloaded to a local cache (block 1030). For example, STB 144 may download channel content 520-X associated with virtual channel ID 510-X and store the content in content cache 415. Customer selection of a local government channel may be detected (block 1040). For example, the customer may use remote control 146 to select a local government channel. Downloaded content from the local cache may be presented (block 1050). For example, in response to the customer selecting the local government channel, local government channel module 401 may present content stored in content cache 415. In one example, local government channel module 401 may present a screen with options for the customer to select, for example, to navigate to a home page associated with the local government, to view a slide show, to view available videos, and/or to access a community message board. In another example, local government channel module 401 may automatically present a slide show from content cache 415.

Figure 11:
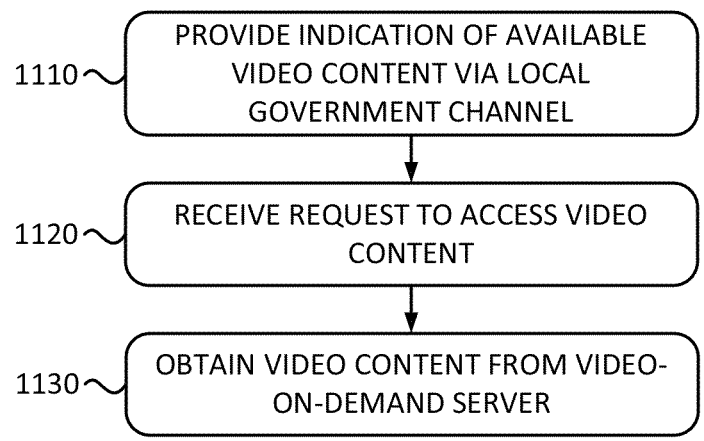
FIG. 11 is a flow chart of an exemplary process for presenting video content from a shared local government channel according to an implementation described herein.

FIG. 11 is a flow chart of an exemplary process for presenting video content from a shared local government channel according to an implementation described herein. In one implementation, the process of FIG. 11 may be performed by STB 144, personal computer 148, or mobile device 160. In other implementations, some or all of the process of FIG. 11 may be performed by another device or a group of devices separate from STB 144, personal computer 148, or mobile device 160 and/or including STB 144, personal computer 148, or mobile device 160.

The process of FIG. 11 may include providing an indication of available video content via a local government channel (block 1110). For example, a customer may select a local government channel and local government channel module 401 may present information about available video files associated with the local government channel. In one example, the information about available video files may be presented on a particular slide of a cycling slide show. In another example, the information about available video files may be presented when the customer selects an option to view information about available video files from a list of viewing options (e.g., from a menu of options).

A request to access video content may be received (block 1120). For example, the customer may request to view an available video file by selecting the video file using remote control 146. Video content may be obtained from a VOD server and presented on a local government channel (block 1130). For example, in response to detecting selection of a video file, VOD interface unit 420 may request the video file from VOD server 115 and VOD server 115 may begin to stream the video file to STB 144.

Figure 12A:
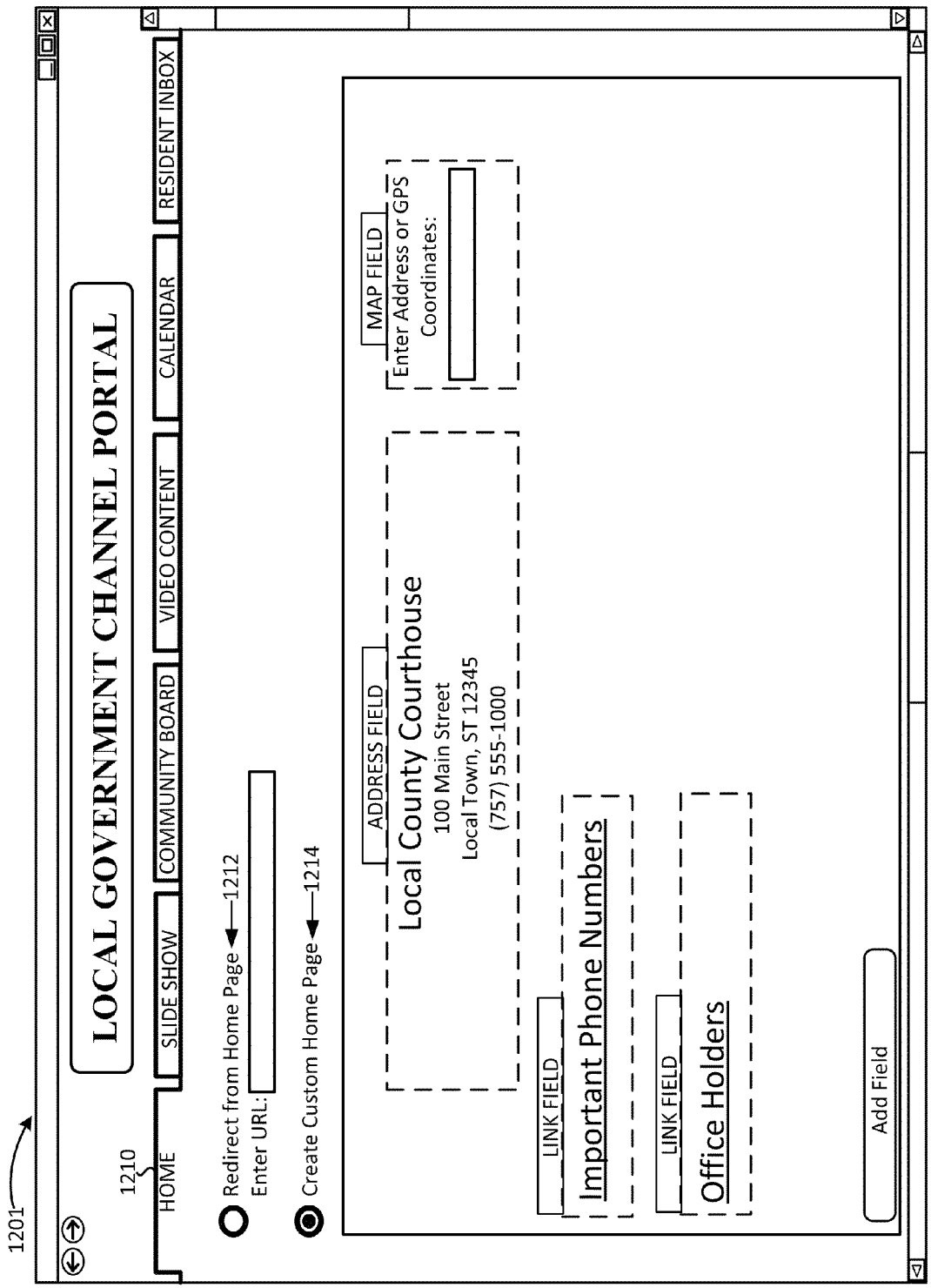
FIGS. 12A-12F are diagrams of exemplary user interfaces that may be provided by a local government portal according to an implementation described herein.

FIGS. 12A-12F are diagrams of exemplary user interfaces that may be provided by local government portal 130 to local government stations 135. FIG. 12A is a diagram of user interface 1201 that may be presented by local government portal 130 to local government station 135. User interface 1201 may include a home tab 1210, that, when selected, may enable an administrator associated with local government station 135 to provide reference information associated with a local government (e.g., home page information). Home tab 1210 may include a redirect option 1212 to redirect information from a home page and a create custom home page option 1214 to create a custom home page that may be provided to customers in connection with a local government channel. The home page may be provided to customers as part of channel content 520 provided by local government portal 130 in a shared local government channel and may provide customers with general information, such as names of government officials, addressed, phone numbers, etc.

Figure 12B:
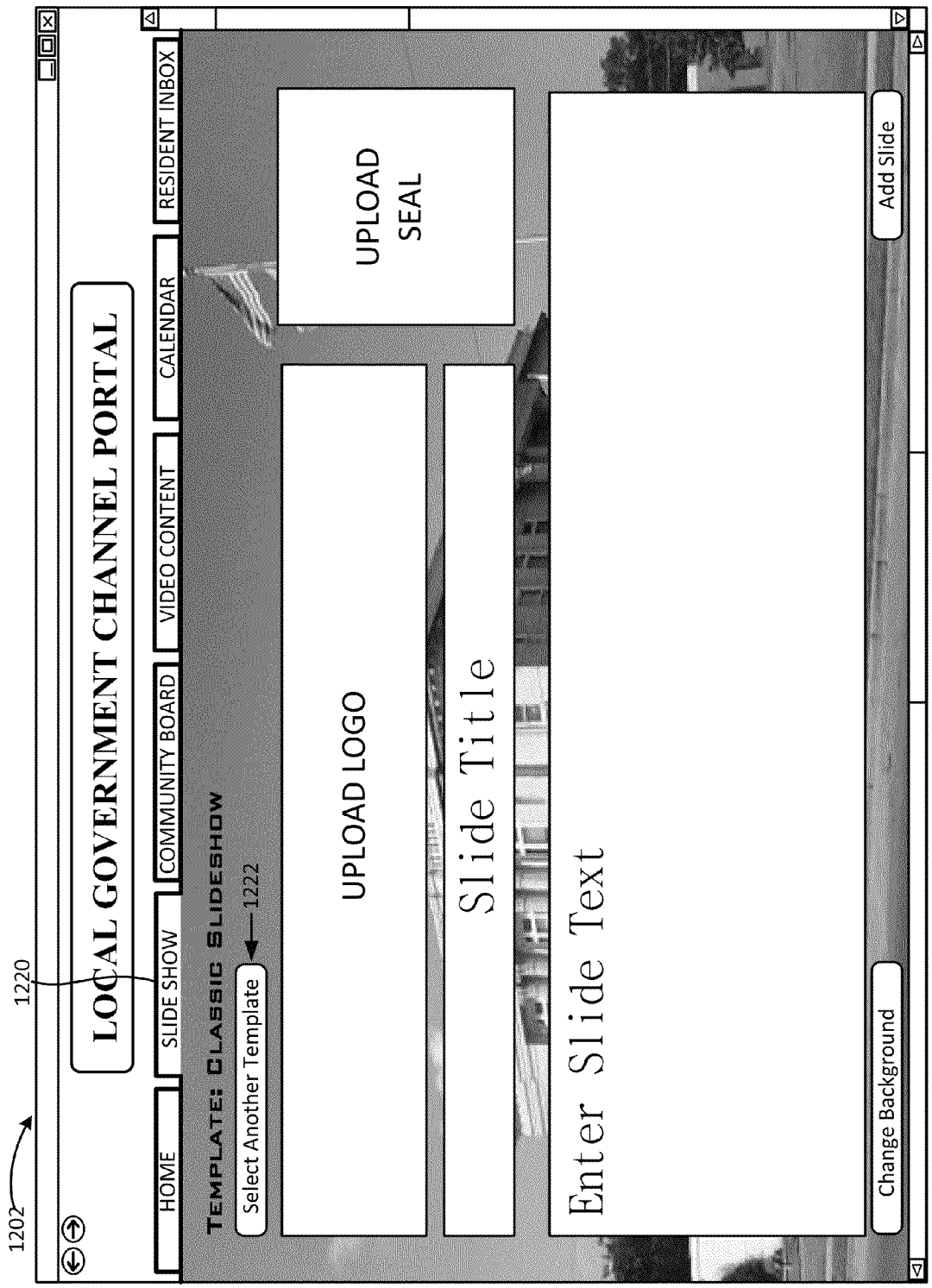

FIG. 12B is a diagram of user interface 1202 that may be presented by local government portal 130 to local government station 135. User interface 1202 may include a slide show tab 1220 that, when selected, may enable an administrator associated with local government station 135 to create a slide show. User interface 1202 may include a template selection object 1222 to enable the administrator to select a template for a slide show. A template may specify components of a slide and the layout of the components. For example, the administrator may upload an image to be used as a background image, may upload a local government seal, a local government logo, may enter text information, may upload graphics, and/or may include other types of elements or information in a slide. Furthermore, user interface 1202 may enable an administrator to create different slide shows for different topics. The slide show may be provided to customers as part of channel content 520 provided by local government portal 130 in a shared local government channel.

Figure 12C:
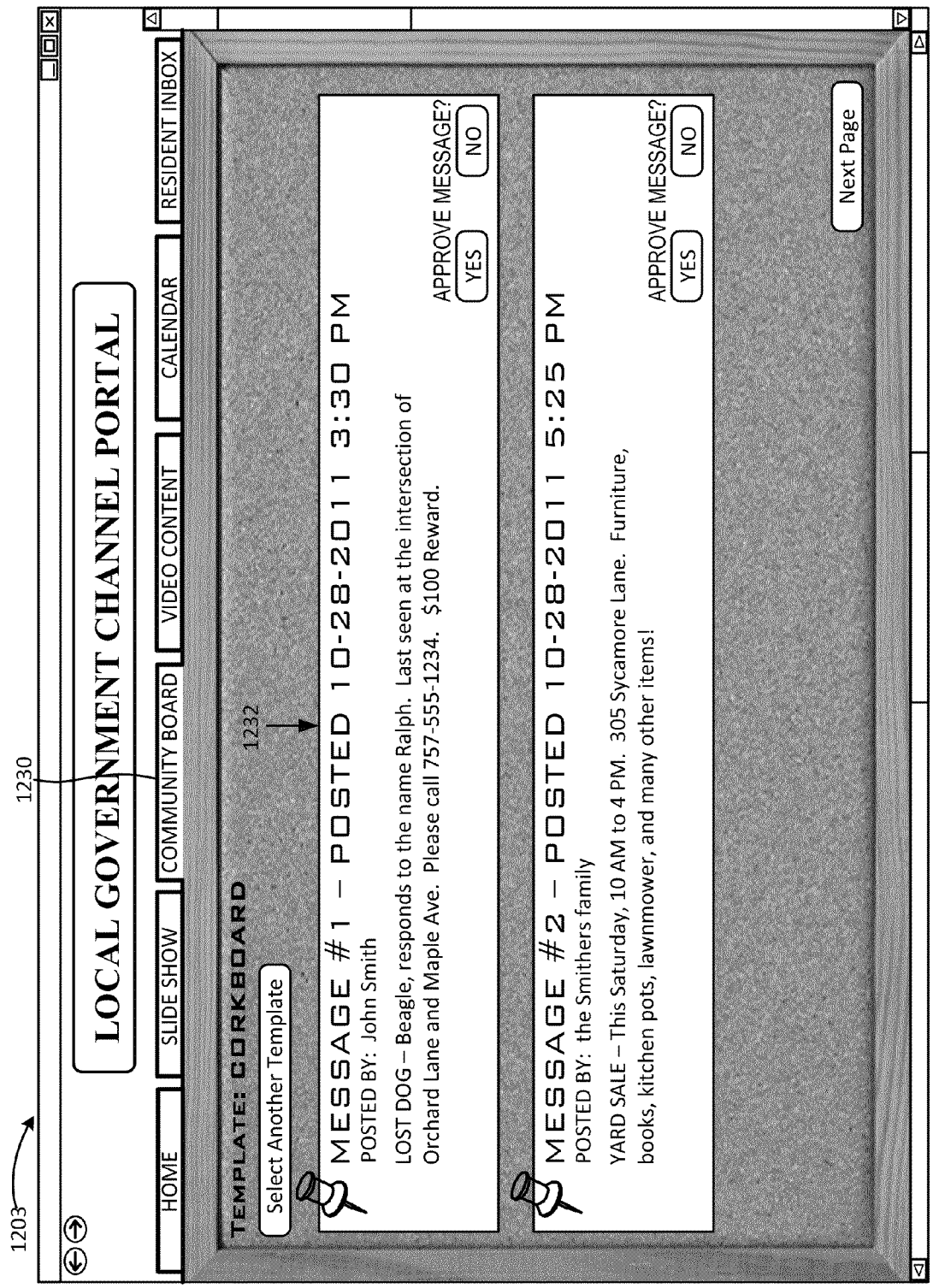

FIG. 12C is a diagram of user interface 1203 that may be presented by local government portal 130 to local government station 135. User interface 1203 may include a community board tab 1230 that, when selected, may enable an administrator associated with local government station 135 to manage a community message board associated with a local government channel. Customers, associated with local government station 135, may post messages 1232 to the community message board. For example, an administrator may approve or disapprove postings to the community message board. Approved messages may be provided to customers as part of channel content 520 provided by local government portal 130 in a shared local government channel.

Figure 12D:
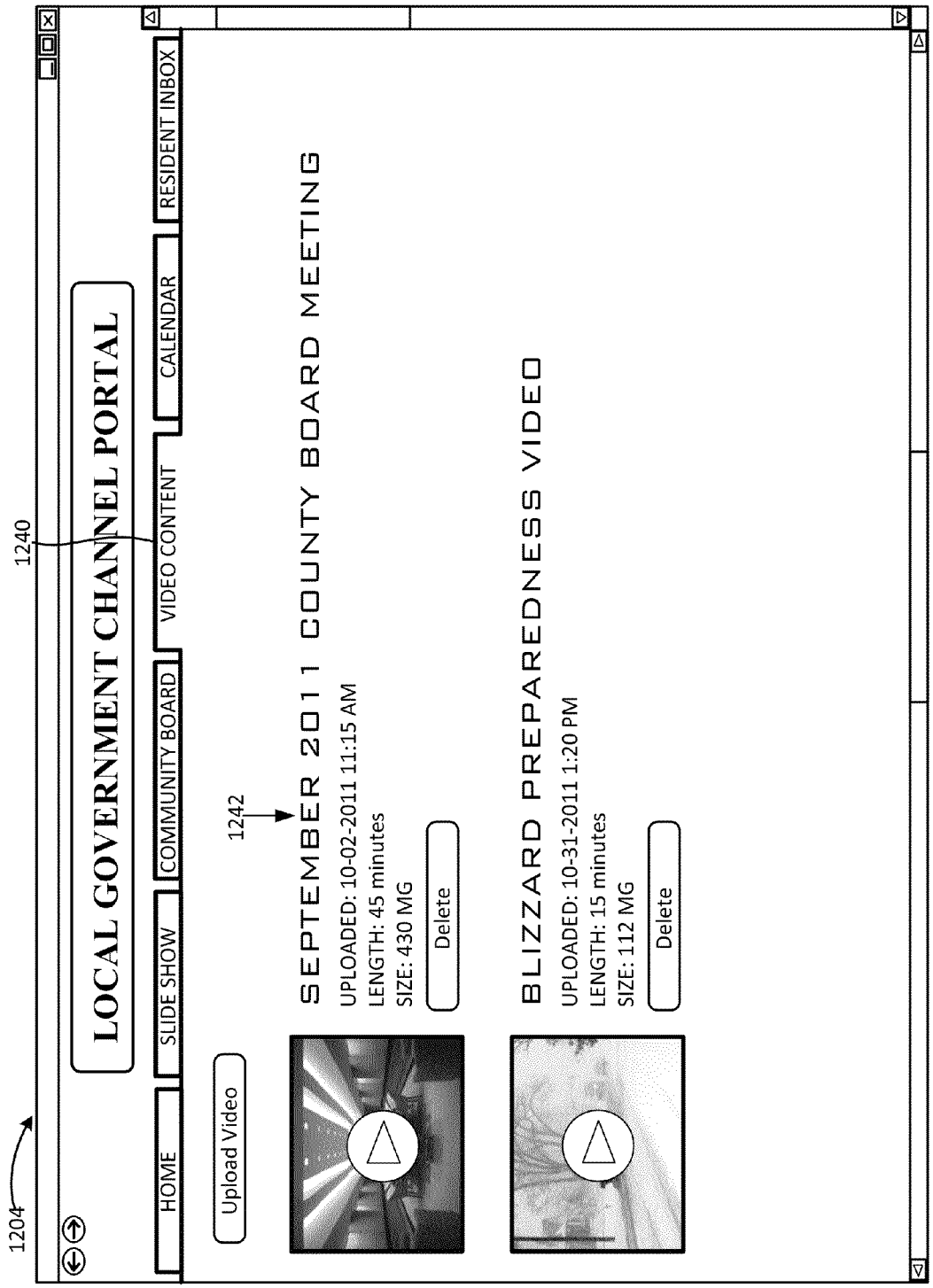

FIG. 12D is a diagram of user interface 1204 that may be presented by local government portal 130 to local government station 135. User interface 1204 may include a video content tab 1240 that, when selected, may enable an administrator associated with local government station 135 to manage video files associated a local government channel. For example, the administrator may upload video files to be made available to customers associated with local government portal 130. Uploaded video files may be stored in VOD server 115 and video file indications 1242, which include information about the uploaded video files, may be included in user interface 1204. The information about the uploaded video files may be provided to customers as part of channel content 520 provided by local government portal 130 in a shared local government channel.

Figure 12E:
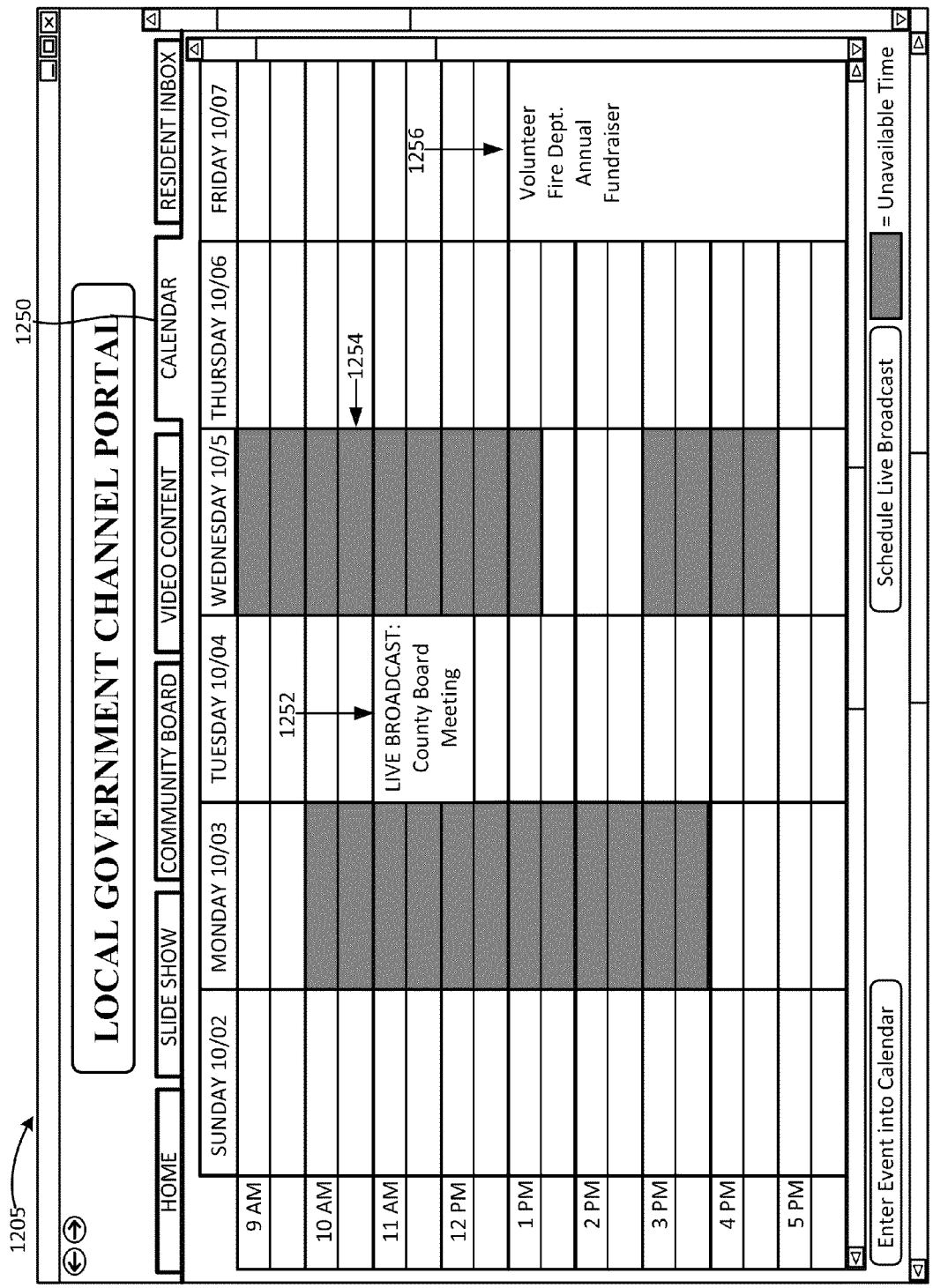

FIG. 12E is a diagram of user interface 1205 that may be presented by local government portal 130 to local government station 135. User interface 1205 may include a calendar tab 1250 that, when selected, may enable an administrator associated with local government station 135 to manage a calendar associated with local government station 135. User interface 1205 may enable the administrator to schedule events 1256 associated with a local government. Furthermore, user interface 1205 may enable the administrator to schedule a live broadcast event 1252 for a shared local government channel. User interface 1205 may include an indication 1254 of unavailable time slots. For example, when a first local government station 135 schedules a live transmission for a particular time slot, the particular time slot may appear as unavailable to other local government stations 135 in user interface 1205. When a particular local government station 135 schedules a live broadcast for a particular time slot, local government portal 130 may cease transmitting transmission sequence 500 and may only transmit a signal from the particular local government station 135 for the duration of the scheduled time slot.

Figure 12F:
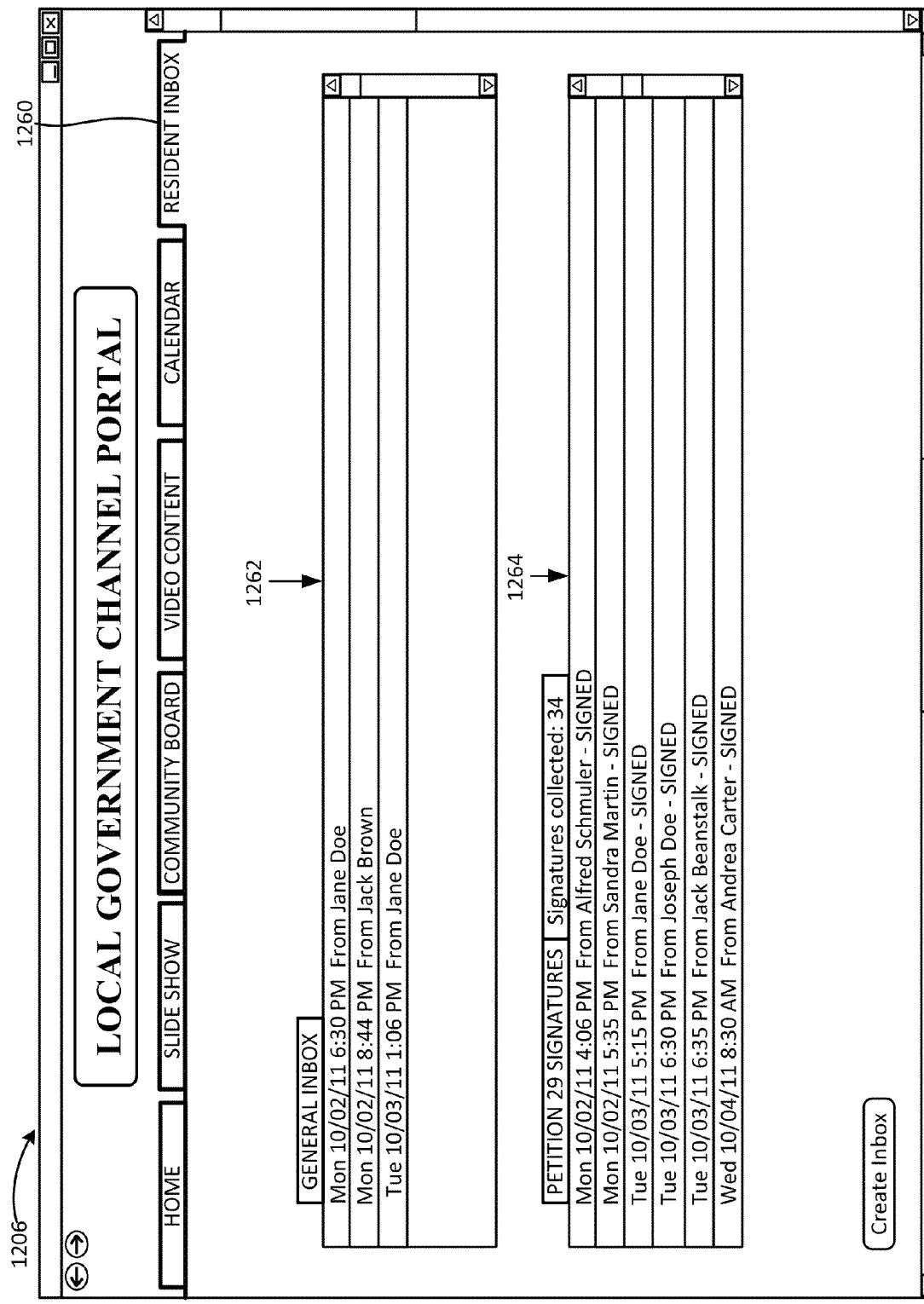

FIG. 12F is a diagram of user interface 1206 that may be presented by local government portal 130 to local government station 135. User interface 1206 may include a resident inbox tab 1260 that, when selected, may enable an administrator associated with local government station 135 to manage one or more inboxes for messages received from customers associated with local government station 135. The customers associated with local government station 135 may correspond to resident of a geographic area associated with the local government of local government station 135. The administrator may create a general inbox 1262 for receiving general messages from customers. Furthermore, the administrator may create a specific inbox 1264 for receiving messages associated with a general topic. For example, the administrator may create an inbox for collecting electronic signatures for a petition.

Figure 13B:
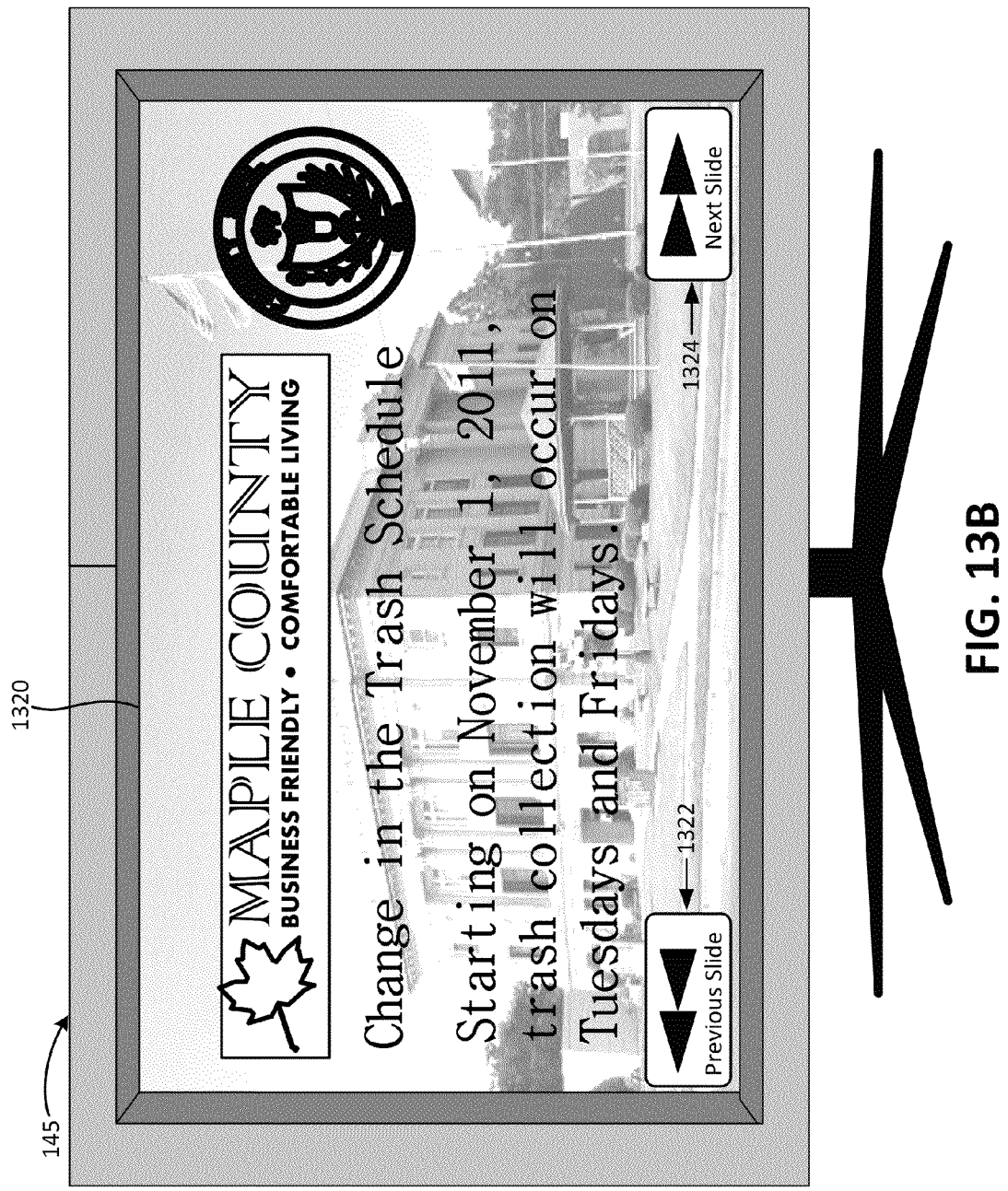
Figure 13C:
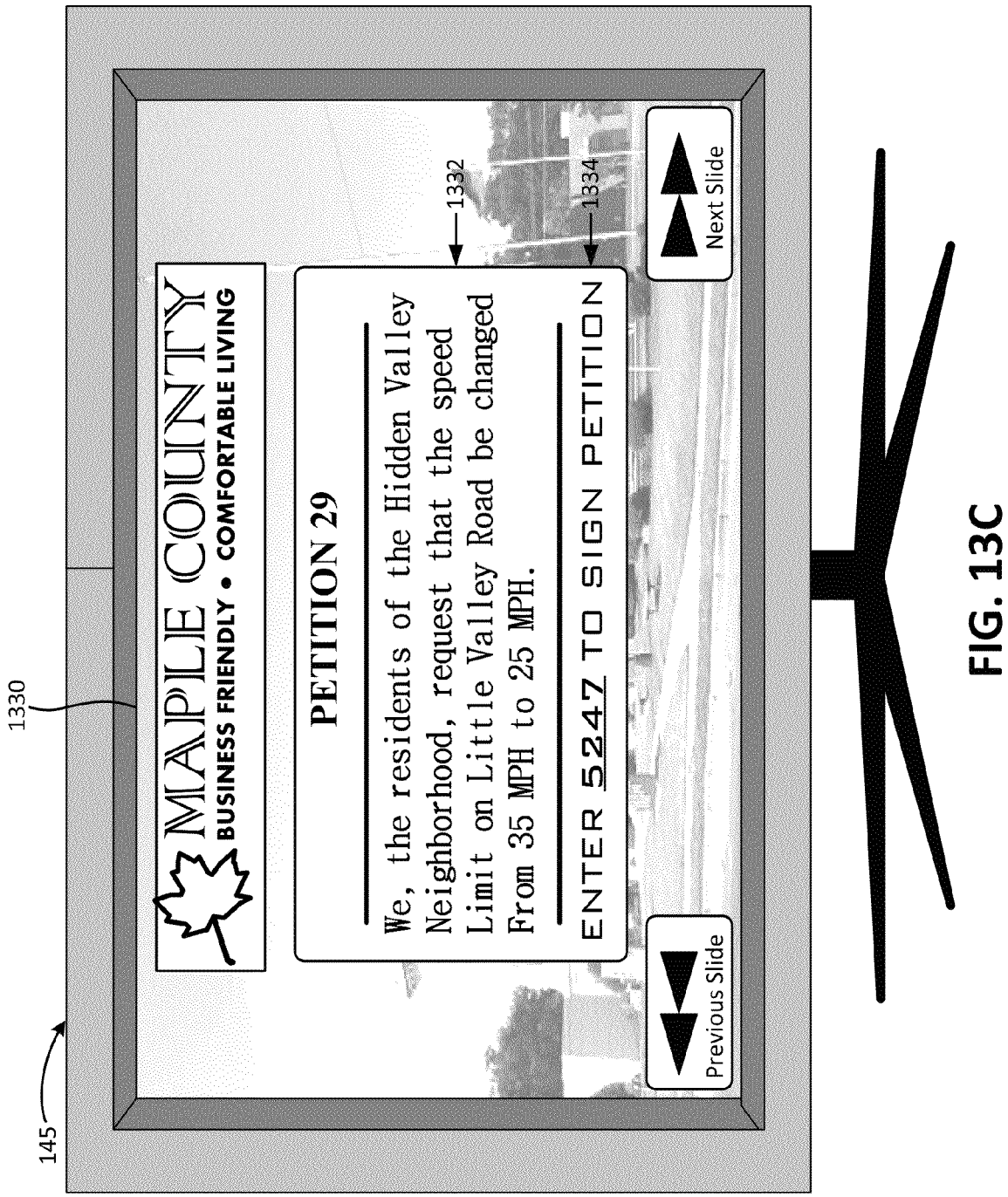

FIGS. 13A-13C are diagrams of exemplary user interfaces provided by STB 144 according to an implementation described herein. FIG. 13A is a diagram of user interface 1310 that may be provided by local government channel module 401 to STB 144 to television 145 (or that may be displayed by personal computer 148 or mobile device 160) in response to a customer selecting a local government channel. User interface 1310 may include a menu that includes a home page selection object 1312, a slide show selection object 1314, a videos selection object 1316, and a community board selection object 1318. In another example, user interface 1310 may include different selection objects, additional selection objects, fewer selection objects, and/or differently arranged selection objects. A customer may select one of the selection objects by, for example, using remote control 146.

Home page selection object 1312 may, when selected, cause local government channel module 401 to present information associated with a local government home page. Slide show selection object 1314 may, when selected, cause local government channel module 401 to present a slide show associated with the local government. Videos selection object 1316 may, when selected, cause local government channel module 401 to present information about video files associated with the local government. Community board selection object 1318 may, when selected, cause local government channel module 401 to present messages from a community message board.

FIG. 13B is a diagram of a user interface 1320 that may include a slide show associated with the local government. In one example, user interface 1320 may be presented by local government channel module 401 automatically when a customer selects a local government channel. In another example, user interface 1320 may be presented by local government channel module 401 in response to a customer selecting slide show selection object 1314. User interface 1320 may include a cycling slide show that presents slides at a particular rate. Additionally or alternatively, a customer may be able to cycle through the slide show manually by selecting a previous slide selection object 1322 or a next slide selection object 1324.

FIG. 13C is a diagram of a user interface 1330 that includes interactive content. User interface 1330 may include a slide of a slide show that prompts a user to enter input. For example, the slide may include information about an electronic petition 1332 that includes an input object 1334 that may collect user input. The customer may user remote control 146 to provide the requested input. In one implementation, input object 1334 may include a script input object, such as a Javascript object, and local government channel module 401 may include a script processor to process the script input object and provide the input to local government portal 130 via an uplink data channel. In another implementation, input object 1334 may be implemented using another technique.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-11, the order of the blocks may be modified in other implementations. Further, non-dependent blocks may be performed in parallel.

Furthermore, while particular implementations are described herein with respect to reducing bandwidth for carrying public access channels as required by law, such as the 1984 Cable Franchise Policy and Communications Act and/or by another such law, another implementation may be used for providing another type of content on a shared channel. For example, another implementation may relate to providing personal advertisements, employment listings, "freecycling" posts, classified advertisements, legal notices, and/or other types of message postings and/or advertisements. The use of a shared channel for such postings and/or advertisements may provide an additional low-cost revenue stream for carriers and/or may reduce cost for existing services, by lowering bandwidth, improving content quality, and/or enabling the use of interactive content.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, unless otherwise noted, articles such as "a", "an" and "the" are intended to include one or more items. Further, the phrase "based on" is intended to mean "based, at least in part, on" unless explicitly stated otherwise.

What is claimed is:

1. A method performed by one or more computer devices, the method comprising:
receiving, by the one or more computer devices, first local government content from a first local government entity;
receiving, by the one or more computer devices, a message posted to a community message board associated with the first local government entity from a customer via a set-top box;
adding, by the one or more computer devices, community message board content to the received first local government content, wherein the community message board content includes the received message;
adding, by the one or more computer devices, a first virtual channel identifier to the received first content;
receiving, by the one or more computer devices, second local government content from a second local government entity;
adding, by the one or more computer devices, a second virtual channel identifier to the received second content;
multiplexing, by the one or more computer devices, the first local government content and the second local government content onto a shared local government channel using time division multiplexing, wherein the first local government content includes the added community message board content; and
transmitting, by the one or more computer devices, the multiplexed first and second local government content via the shared local government channel.

2. The method of claim 1, wherein the shared local government channel includes a quadrature amplitude modulation channel.

3. The method of claim 1, further comprising:
receiving a request for a live transmission from the first local government entity for a particular time slot;
determining that the particular time slot is available by accessing a calendar of scheduled live transmissions associated with the shared local government channel; and
transmitting the live transmission from the first local government entity during the particular time slot, in response to determining that the particular time slot is available, wherein transmission of the second local government content is paused during the particular time slot.

4. The method of claim 1, wherein the receiving the first local government content from the first local government entity includes:
providing a web portal to the first local government entity; and
receiving the content via the web portal.

5. The method of claim 4, wherein the providing the web portal to the first local government entity includes:
providing a plurality of templates for creating a slide show to the first local government entity;
receiving a selection of a template from the first local government entity;
receiving slide show content to be included in a slide show based on the selected template; and
generating a slide show that includes the slide show content, wherein the received first local government content includes the generated slide show.

6. The method of claim 1, wherein the received first local government content includes a video or audio file, the method further comprising:
identifying a particular video-on-demand server associated with the first local government entity;
storing the video or audio file on the particular video-on-demand server; and
including, in the received first local government content, an indication that the video or audio file is available from the particular video-on-demand server.

7. The method of claim 1, wherein the received first local government content includes interactive content, the method further comprising:
generating an inbox associated with the interactive content;

receiving input from the customer associated with the first local government entity;
determining that the received input is associated with the interactive content; and
storing the received input in the generated inbox, in response to determining that the received input is associated with the interactive content.

8. The method of claim 1, further comprising:
receiving approval from the first local government entity to include the received message on the community message board; and
including the posting in the community message board content, in response to receiving the approval from the first local government entity to include the received message on the community message board.

9. The method of claim 1, wherein the transmitting the multiplexed first and second local government content via the shared local government channel includes:
transmitting the shared local government channel via at least one of a super head end or a local head end associated with a provider of television services.

10. A system comprising:
one or more computing devices configured to:
receive first local government content from a first local government entity;
receive a message posted to a community message board associated with the first local government entity from a customer via a set-top box;
add community message board content to the received first local government content, wherein the community message board content includes the received message;
associate a first virtual channel identifier with the received first local government content;
receive second local government content from a second local government entity;
associate a second virtual channel identifier with the received second content;
multiplex the first local government content and the second local government content onto a shared local government channel using time division multiplexing, wherein the first local government content includes the added community message board content; and
transmit the multiplexed first and second local government content via the shared local government channel.

11. The system of claim 10, wherein the one or more computing devices are further configured to:
receive a request for a live transmission from the first local government entity for a particular time slot;
determine that the particular time slot is available by accessing a calendar of scheduled live transmissions associated with the shared local government channel; and
transmit the live transmission from the first local government entity during the particular time slot, in response to determining that the particular time slot is available, wherein transmission of the second local government content is paused during the particular time slot.

12. The system of claim 10, wherein the one or more computing devices are further configured to:
provide a web portal to the first local government entity; and
receive the first local government content via the web portal.

13. The system of claim 10, wherein the one or more computing devices are further configured to:
provide a plurality of templates for creating a slide show to the first local government entity;
receive a selection of a template from the first local government entity;
receive slide show content to be included in a slide show based on the selected template; and
generate a slide show that includes the slide show content, wherein the received first local government content includes the generated slide show.

14. The system of claim 10, further comprising:
the set-top box configured to:
receive the shared local government channel;
detect the first virtual channel identifier;
download the first local government content in response to detecting the first virtual channel identifier; and
store the downloaded first local government content in a cache associated with the set-top box.

15. The system of claim 14, wherein the set-top box is further configured to:
detect selection of a local government channel; and
present the downloaded first local government content from the cache, in response to detecting the selection of the local government channel.

16. The system of claim 15, wherein the set-top box is further configured to:
receive input from a remote control in response to presenting the downloaded content; and
provide the received input to at least one of the one or more computing devices.

17. A non-transitory computer-readable memory device storing instructions executable by one or more processors that cause the one or more processors to execute a method comprising:
receiving first local government content from a first local government entity;
receiving a message posted to a community message board associated with the first local government entity from a customer via a set-top box;
adding community message board content to the received first local government content, wherein the community message board content includes the received message messages posted to a community message board by customers associated with the first local government entity;
adding a first virtual channel identifier to the received first local government content;
receiving second local government content from a second local government entity;
adding a second virtual channel identifier to the received second content;
multiplexing the first local government content and the second local government content onto a shared local government channel using time division multiplexing, wherein the first local government content includes the added community message board content; and
transmitting the multiplexed first and second local government content via the shared local government channel.

18. The non-transitory computer-readable memory device of claim 17, the method further comprising:
receiving a request for a live transmission from the first local government entity during a particular time slot;
determining that the particular time slot is available by accessing a calendar of scheduled live transmissions associated with the shared local government channel; and transmitting the live transmission from the first local government entity during the particular time slot, in response to determining that the particular time slot is available, wherein transmission of the second local government content is paused during the particular time slot.

19. The non-transitory computer-readable memory device of claim 17, wherein the received first local government content includes a video or audio file, the method further comprising:
   determining a particular video-on-demand server associated with the first local government entity;
   storing the video or audio file on the particular video-on-demand server; and
   including, in the received first local government content, an indication that the video or audio file is available from the particular video-on-demand server.

* * * * *